(12) United States Patent
Kishine

(10) Patent No.: US 9,952,444 B2
(45) Date of Patent: *Apr. 24, 2018

(54) METHOD FOR MANUFACTURING IMAGING MODULE AND IMAGING-MODULE MANUFACTURING DEVICE

(71) Applicant: FUJIFILM Corporation, Tokyo (JP)

(72) Inventor: Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 15/230,037

(22) Filed: Aug. 5, 2016

(65) Prior Publication Data

US 2016/0341974 A1 Nov. 24, 2016

Related U.S. Application Data

(63) Continuation of application No. PCT/JP2014/081728, filed on Dec. 1, 2014.

(30) Foreign Application Priority Data

Feb. 26, 2014 (JP) .................................. 2014-035034

(51) Int. Cl.
*G02B 27/62* (2006.01)
*G03B 5/00* (2006.01)
(Continued)

(52) U.S. Cl.
CPC .............. *G02B 27/62* (2013.01); *B32B 37/12* (2013.01); *G02B 27/646* (2013.01); *G03B 5/00* (2013.01);
(Continued)

(58) Field of Classification Search
CPC ............ B32B 37/12; B32B 2307/1253; B32B 2307/40; B32B 2251/40; G02B 27/62;
(Continued)

(56) References Cited

U.S. PATENT DOCUMENTS

2009/0067827 A1 3/2009 Yoshida et al.
2009/0180021 A1* 7/2009 Kikuchi ............... H04N 5/2253
348/349

(Continued)

FOREIGN PATENT DOCUMENTS

JP 2007-183488 A 7/2007
JP 2009-71495 A 4/2009
(Continued)

OTHER PUBLICATIONS

English Translation of International Preliminary Report on Patentability for PCT/JP2014/081728 (including PCT/IB/373 and PCT/ISA/237), dated Aug. 30, 2016.

(Continued)

*Primary Examiner* — George Koch
(74) *Attorney, Agent, or Firm* — Birch, Stewart, Kolasch & Birch, LLP

(57) ABSTRACT

Provided are a method for manufacturing an imaging module and an imaging-module manufacturing device that can enhance the flexibility of disposition of components in an electronic device. An amount of tilt by which and a direction of tilt in which a movable image-stabilizing unit is tilted in a state where a lens unit is installed in the electronic device including a magnetic-field generating unit are acquired in advance. On the basis of the amount of tilt by which and the direction of tilt in which the movable image-stabilizing unit is tilted, acquired in advance, the lens unit and the imaging device unit are fixed to each other in the state where an optical axis of the lens group is tilted by the amount of tilt (Continued)

in a direction opposite to the direction of tilt from a first reference position perpendicular to an imaging surface of the imaging device.

20 Claims, 25 Drawing Sheets

(51) Int. Cl.
| | |
|---|---|
| H04N 5/225 | (2006.01) |
| G03B 43/00 | (2006.01) |
| H04N 5/232 | (2006.01) |
| B32B 37/12 | (2006.01) |
| G02B 27/64 | (2006.01) |

(52) U.S. Cl.
CPC ........... *G03B 43/00* (2013.01); *H04N 5/2257* (2013.01); *H04N 5/2328* (2013.01); *H04N 5/23287* (2013.01); *B32B 2037/1253* (2013.01); *B32B 2307/40* (2013.01); *B32B 2551/00* (2013.01); *G03B 2205/0007* (2013.01)

(58) Field of Classification Search
CPC ........ G02B 27/646; G03B 5/00; G03B 43/00; G03B 2205/0007; H04N 5/2257; H04N 5/2328; H04N 5/23287
See application file for complete search history.

(56) References Cited

U.S. PATENT DOCUMENTS

| | | | |
|---|---|---|---|
| 2013/0314810 A1 | 11/2013 | Sekimoto et al. | |
| 2015/0118447 A1* | 4/2015 | Fujikawa | ............... H05K 3/305 |
| | | | 428/172 |

FOREIGN PATENT DOCUMENTS

| | | |
|---|---|---|
| JP | 2010-21985 A | 1/2010 |
| JP | 2012-256017 A | 12/2012 |

OTHER PUBLICATIONS

International Search Report for PCT/JP2014/081728 (PCT/ISA/210) dated Mar. 3, 2015.
Written Opinion of the International Searching Authority for PCT/JP2014/081728 (PCT/ISA/237) dated Mar. 3, 2015.

* cited by examiner

FIG. 12A
COMPARATIVE EXAMPLE
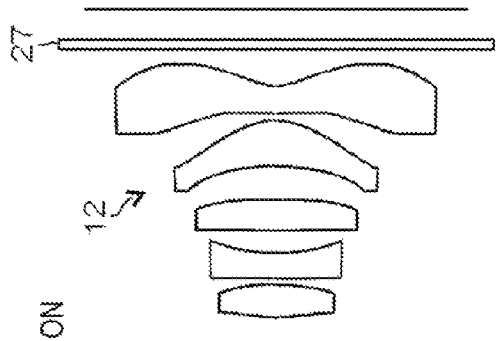
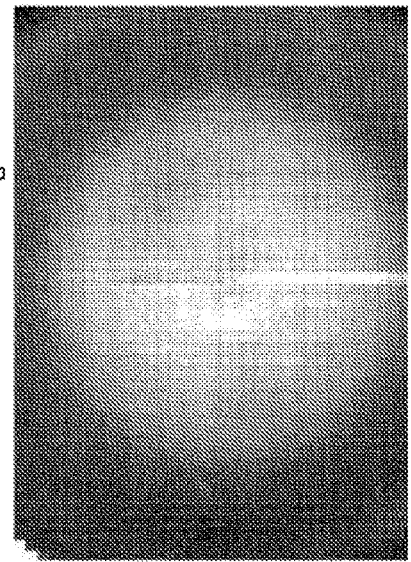
RESOLUTION OVER SCREEN IS VARIED BY TILT
FIG. 12B
PRESENT INVENTION
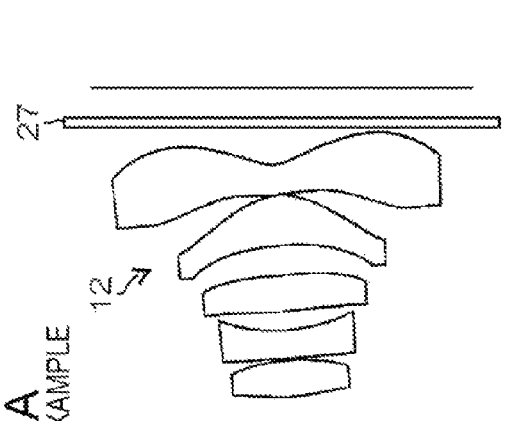
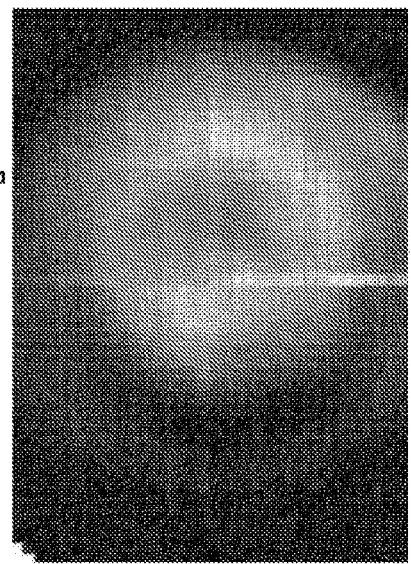
UNIFORMITY OF RESOLUTION IS ENHANCED AS A RESULT OF MAGNETIC FIELD ADJUSTING TILT

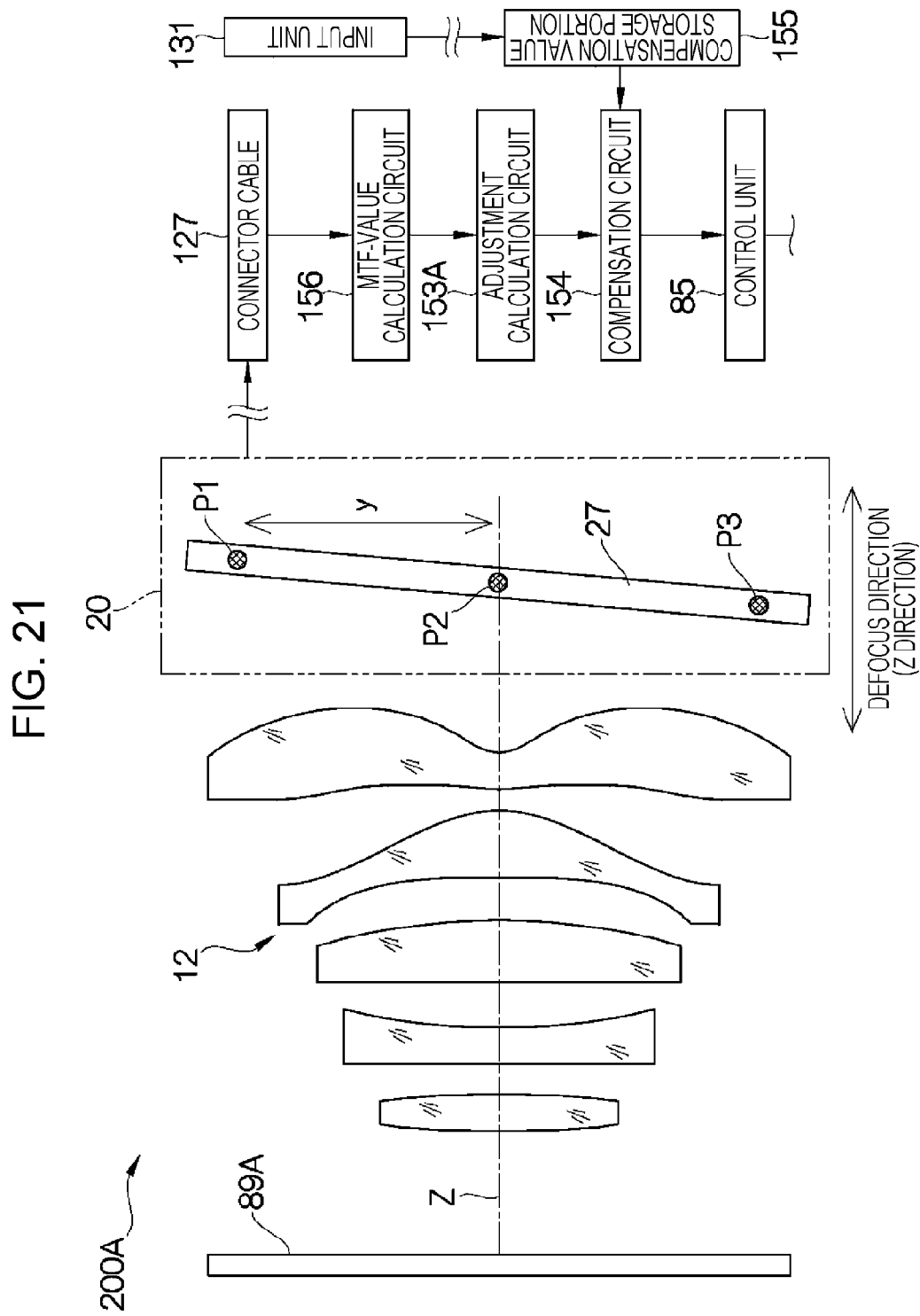

METHOD FOR MANUFACTURING IMAGING MODULE AND IMAGING-MODULE MANUFACTURING DEVICE

CROSS-REFERENCE TO RELATED APPLICATIONS

This application is a Continuation of PCT International Application No. PCT/JP2014/081728 filed on Dec. 1, 2014, which claims priority under 35 U.S.C § 119(a) to Patent Application No. 2014-035034 filed in Japan on Feb. 26, 2014, all of which are hereby expressly incorporated by reference into the present application.

BACKGROUND OF THE INVENTION

1. Field of the Invention

The present invention relates to a method and a device for manufacturing an imaging module having an optical image stabilizing function.

2. Description of the Related Art

As is well known in recent years, some of imaging modules installed in electronic devices, such as mobile phones, smartphones, or tablet computers, have an optical image stabilizer (OIS) function (see Japanese Unexamined Patent Application Publication No. JP2012-256017A).

An OIS mechanism disclosed in Japanese Unexamined Patent Application Publication No. JP2012-256017A employs a so-called suspension support structure. The optical image stabilizer (OIS) mechanism has a structure in which a movable image-stabilizing unit (imaging unit) is supported at four corners using four suspension wires and the movable image-stabilizing unit is driven in two-axis directions perpendicular to the optical axis for image stabilization. A mechanism for driving the movable image-stabilizing unit includes magnets, disposed on four outer-peripheral side surfaces of a cover portion on which the movable image-stabilizing unit is mounted, and a coil, disposed on a fixed-body-side yoke so as to oppose the magnets. This driving mechanism allows the movable image-stabilizing unit to be driven for image stabilization independently of two axes perpendicular to the optical axis.

An imaging module is manufactured as a result of fixing a lens unit including such an OIS mechanism (including a movable image-stabilizing unit and suspension wires) and a lens group to an imaging device unit including an imaging device. When the lens unit and the imaging device unit are fixed to each other, a so-called one-sided blurring problem, which renders a portion of an image out of focus, occurs unless the position of the lens group relative to the imaging device is accurately set. Thus, a method is provided for fixing a lens unit to an imaging device unit in the state where a lens group is adjusted to be in a predetermined reference position using a jig disclosed in, for example, Japanese Unexamined Patent Application Publication No. JP2012-256017A.

Japanese Unexamined Patent Application Publication No. JP2010-021985A discloses the following method for manufacturing an imaging module. In the method, an imaging device unit and a lens unit are set on an axis perpendicular to a measurement chart. The relative position of the imaging device unit, the lens unit, and the measurement chart on the axis is changed. A reference position of a lens group is calculated on the basis of results obtained after an imaging device captures an image of the measurement chart at each relative position. The imaging device unit and the lens unit are fixed to each other in the state where the tilts and the positions of the imaging device unit and the lens unit have been adjusted on the basis of these results.

An imaging module having an OIS mechanism of a suspension support structure is affected by a magnetic field produced by an electronic device on which this imaging module is mounted. FIG. 27 is a cross-sectional view of a main portion of a smartphone 2 when an imaging module 1 is mounted on the smartphone 2. As illustrated in this drawing, a speaker 3 is disposed near the imaging module 1. Thus, the imaging module 1 is affected by a magnetic force generated by the speaker 3, thereby resulting in a problem of tilting of the lens group from the reference position.

Japanese Unexamined Patent Application Publication No. JP2009-071495A describes that when a speaker, which is a magnetic-field generating unit, has a magnetic force of 100 gausses and an imaging module is spaced apart from the speaker by 10 mm or longer, a reliable operation of the imaging module is ensured.

As in the case of the invention described in Japanese Unexamined Patent Application Publication No. JP2009-071495A, an imaging module is usually disposed in an electronic device so as to be spaced a distance apart from a magnetic-field generating unit. However, because of reasons such as the design or space of the electronic device, in some cases, the imaging module has to be disposed near the magnetic-field generating unit in the electronic device. In such cases, the movable image-stabilizing unit is tilted by being affected by the magnetic field produced by the magnetic-field generating unit. This causes a problem of tilting of the lens group in the movable image-stabilizing unit from the reference position.

SUMMARY OF THE INVENTION

The present invention was made in view of such circumstances. An object of the present invention is to provide a method for manufacturing an imaging module and an imaging-module manufacturing device that can enhance the flexibility of disposition of components in an electronic device.

A method for manufacturing an imaging module for achieving the object of the present invention is a method for manufacturing an imaging module, the imaging module comprises, a lens unit having a lens group, and an imaging device unit being fixed to the lens unit and having an imaging device that captures an image of an object through the lens group, and the lens unit comprises a movable image-stabilizing unit having the lens group and a magnetic member, and an elastic support unit supporting the movable image-stabilizing unit such that the movable image-stabilizing unit is movable in a direction perpendicular to an optical axis of the lens group and tiltable around an axis perpendicular to the optical axis. The method includes a fixing step that fixes the lens unit and the imaging device unit to each other in a state where, on a basis of a tilt amount and a tilt direction of the movable image-stabilizing unit being acquired in advance in a state where the lens unit is installed in an electronic device including a magnetic-field generating unit, the optical axis of the lens group is tilted from a first reference position perpendicular to an imaging surface of the imaging device by the tilt amount in a direction opposite to the tilt direction.

According to the present invention, when the imaging module is installed in the electronic device, the lens group is adjusted to be in the first reference position as a result of the movable image-stabilizing unit being tilted by a magnetic field applied from the magnetic-field generating unit to the lens unit. The lens group can thus be prevented from being tilted from the first reference position even when the imaging module is disposed near the magnetic-field generating unit in the electronic device. Thus, the resolution over a screen displaying an image captured by the imaging module can be rendered uniform.

A method for manufacturing an imaging module for achieving the object of the present invention is a method for manufacturing an imaging module, the imaging module comprises, a lens unit having a lens group, and an imaging device unit being fixed to the lens unit and having an imaging device that captures an image of an object through the lens group, and the lens unit comprises a movable image-stabilizing unit having the lens group and a magnetic member, and an elastic support unit supporting the movable image-stabilizing unit such that the movable image-stabilizing unit is movable in a direction perpendicular to an optical axis of the lens group and tiltable around an axis perpendicular to the optical axis. The method includes a focus information acquiring step, a reference position calculation step, and a fixing step. In the focus information acquiring step, the imaging device unit and the lens unit are set on an axis perpendicular to a measurement chart, a relative position of the imaging device unit, the lens unit, and the measurement chart on the axis perpendicular to the measurement chart is changed to various relative positions, images of the measurement chart are captured by the imaging device at the relative positions, first focus information indicating a degree of focus at a plurality of imaging positions determined on an imaging surface of the imaging device is obtained from image-capturing signals of the imaging device acquired at the relative positions. In the reference position calculation step, a second reference position of the lens group is captured on the basis of the first focus information acquired in the focus information acquiring step. In the fixing step, fixing the lens unit and the imaging device unit to each other, on a basis of the second reference position calculated in the reference position calculation step and a tilt amount and a tilt direction of the movable image-stabilizing unit being acquired in advance in a state where the lens unit is installed in an electronic device including a magnetic-field generating unit, in a state where the optical axis of the lens group is tilted from the second reference position by the amount of tilt in a direction opposite to the direction of tilt.

According to the present invention, when the imaging module is installed in the electronic device, the lens group is adjusted to be in the second reference position as a result of the movable image-stabilizing unit being tilted by a magnetic field applied from the magnetic-field generating unit to the lens unit. The lens group can thus be prevented from being tilted from the second reference position even when the imaging module is disposed near the magnetic-field generating unit in the electronic device. Thus, the resolution over a screen displaying an image captured by the imaging module can be rendered uniform.

In a method for manufacturing an imaging module according to another aspect of the present invention, the tilt amount and the tilt direction of the movable image-stabilizing unit are acquired by measuring in a state where a magnetic field is applied from the magnetic-field generating unit to the lens unit and in a state where a magnetic field is not applied from the magnetic-field generating unit to the lens unit respectively and comparing the tilt amounts and the tilt directions with each other. From a difference between evaluated conditions (in a state where the magnetic-field generating unit is not installed) and actual operation conditions (in a state where the magnetic-field generating unit is installed), the tilt amount and the tilt direction in which the movable image-stabilizing unit is tilted can be acquired in advance.

In a method for manufacturing an imaging module according to another aspect of the present invention, the tilt amount and the tilt direction are acquired by changing, in a state where a magnetic field is applied from the magnetic-field generating unit to the lens unit, a relative position of the imaging device unit, the lens unit, and the measurement chart on an axis perpendicular to the measurement chart to a plurality of relative positions, capturing images of the measurement chart at the relative positions using the imaging device, acquiring second focus information indicating a degree of focus at each of a plurality of imaging positions determined on the imaging surface at the relative positions from image-capturing signals acquired by the imaging device at the relative positions, and comparing the first focus information and the second focus information with each other. Thus, the tilt amount and the tilt direction in which the movable image-stabilizing unit is tilted can be automatically measured.

In a method for manufacturing an imaging module according to another aspect of the present invention, the first focus information and the second focus information are acquired by measuring a resolution of the lens group. The first and the second focus information can be acquired by using measurement results of the resolution of the lens group. Thus, the resolution over a screen displaying an image captured by the imaging module can be rendered uniform.

In a method for manufacturing an imaging module according to another aspect of the present invention, the measurement chart has a stripe pattern, and the first focus information and the second focus information are acquired by measuring a modulation transfer function(MTF) as the resolution. The first focus information and the second focus information can be acquired by using measurement results of a MTF, which is a most typical example of the resolution.

In a method for manufacturing an imaging module according to another aspect of the present invention, the MTF is preferably a low-frequency MTF acquired by capturing an image of the stripe pattern having a pattern pitch corresponding to 10 pixels to 20 pixels of the imaging device. If a high-frequency MTF is used, manufacturing errors such as formation or assembly errors of the lens group are reflected on the first and second focus information. However, use of a low-frequency MTF enables accurate measurement of the effect of the magnetic field, so that more accurate first and second focus information can be acquired.

In a method for manufacturing an imaging module according to another aspect of the present invention, the tilt amount and the tilt direction are acquired by calculating a tilt position of the lens group from the second focus information and comparing the tilt position with the second reference position. Thus, the tilt amount and the tilt direction in which the movable image-stabilizing unit is tilted can be acquired.

In a method for manufacturing an imaging module according to another aspect of the present invention, in the fixing step, the lens unit and the imaging device unit are fixed to each other by supplying an adhesive between the lens unit and the imaging device unit and by causing the adhesive to cure after the lens unit is tilted relative to the imaging device unit. Thus, the lens unit and the imaging device unit can be fixed to each other after the lens unit is tilted relative to the imaging device unit.

In a method for manufacturing an imaging module according to another aspect of the present invention, a pixel pitch of the imaging device is preferably smaller than or equal to 1.0 μm. If the imaging device has a narrow pixel pitch, the radius of a permissible circle of confusion is small and the depth of focus is small. Thus, when the pixel pitch is smaller than or equal to 1.0 μm, the position of the lens group relative to the imaging device has to be determined (faced) with high accuracy. The imaging module achieved by the present invention determines the position of the lens group relative to the imaging device with high accuracy.

An imaging-module manufacturing device for achieving the object of the present invention includes a measurement-chart installation portion that allows a measurement chart to be installed thereon; an imaging-device-unit holding portion that holds an imaging device unit on an axis perpendicular to the measurement chart installed on the measurement-chart installation portion, the imaging device unit including an imaging device that captures an image of an object through a lens unit including a lens group; a lens-unit holding portion that holds the lens unit at a position on the axis between the measurement-chart installation portion and the imaging-device-unit holding portion; a chart imaging control unit that changes a relative position of the measurement-chart installation portion, the lens-unit holding portion, and the imaging-device-unit holding portion on the axis to a plurality of relative positions and captures images of the measurement chart installed on the measurement-chart installation portion at the relative positions using the imaging device of the imaging device unit held by the imaging-device-unit holding portion through the lens unit held by the lens-unit holding portion; a focus-information acquiring portion that acquires first focus information for each of the relative positions from image-capturing signals acquired by the imaging device at the relative positions, the first focus information indicating a degree of focus at each of a plurality of imaging positions determined on an imaging surface of the imaging device; a reference position calculation portion that calculates a second reference position of the lens group on a basis of the first focus information for each of the relative positions acquired by the focus-information acquiring portion; an input unit that inputs a compensation angle and a compensation direction with which the second reference position is compensated; an adjustment portion that adjusts a tilt of the imaging device unit held by the imaging-device-unit holding portion relative to the lens unit held by the lens-unit holding portion on a basis of the second reference position calculated by the reference position calculation portion and the compensation angle and the compensation direction input to the input unit; and a unit-fixing portion that fixes the imaging device unit adjusted by the adjustment portion to the lens unit.

A method for manufacturing an imaging module and an imaging-module manufacturing device according to the present invention can provide an imaging module that enhances the flexibility of disposition of components in an electronic device.

BRIEF DESCRIPTION OF THE DRAWINGS

FIG. 12A illustrates a relationship between an imaging device unit and a lens group of an existing imaging module according to a comparative example and a distribution of the resolution over a screen of the imaging device and FIG. 12B illustrates a relationship between an imaging device unit and a lens group of an imaging module according to the present invention and a distribution of the resolution over a screen of the imaging device;
FIG. 21 is a schematic diagram of an imaging-module manufacturing device according to a third embodiment.

DESCRIPTION OF THE PREFERRED EMBODIMENTS

Referring to the attached drawings, a method for manufacturing an imaging module and an imaging-module manufacturing device according to the present invention are described below.

<Configuration of Imaging Module>

Figure 1:
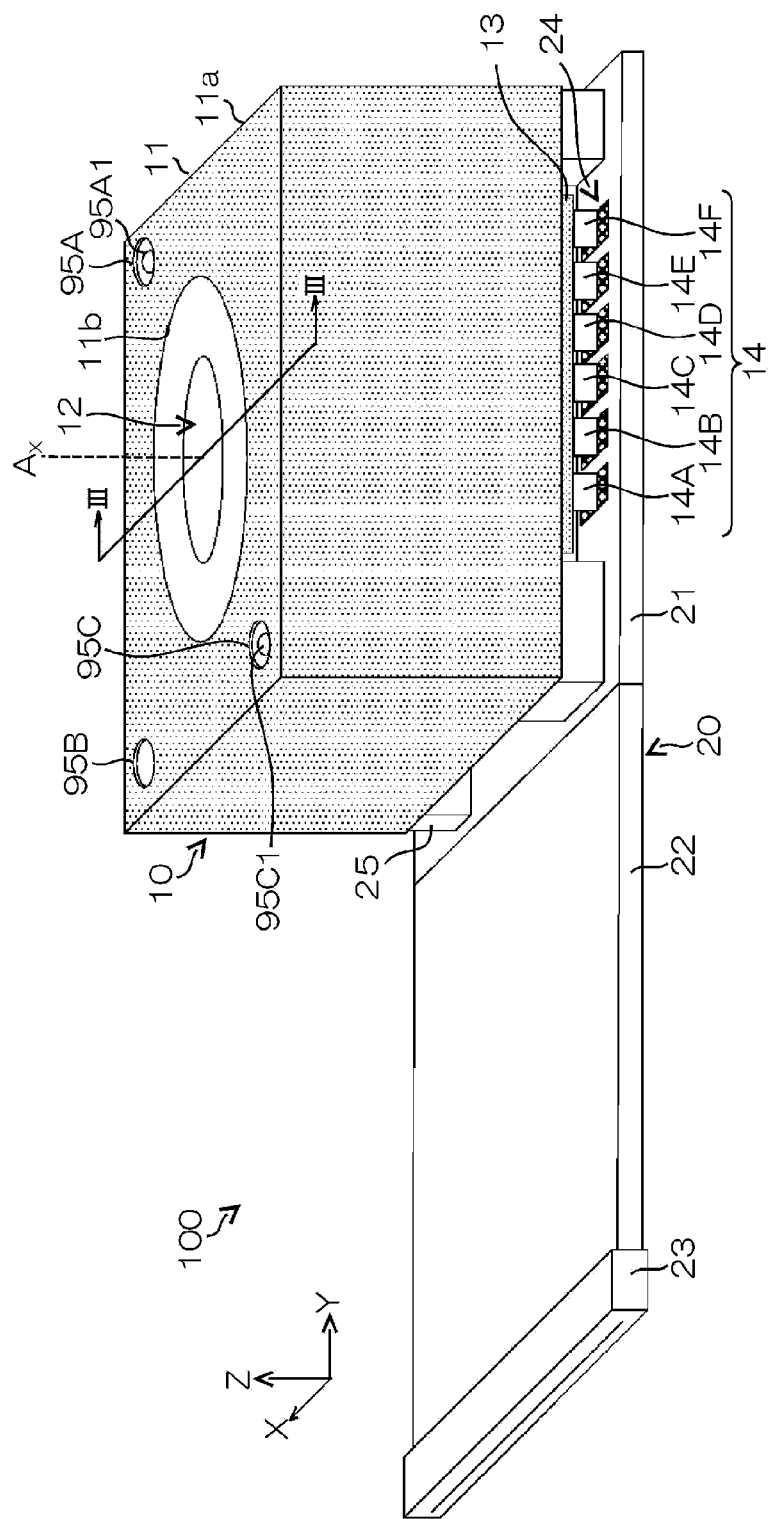
FIG. 1 is a perspective view of the exterior of an imaging module.

FIG. 1 is a perspective view of the exterior of an imaging module 100 manufactured by a method for manufacturing an imaging module and an imaging-module manufacturing device according to the present invention.

Figure 2:
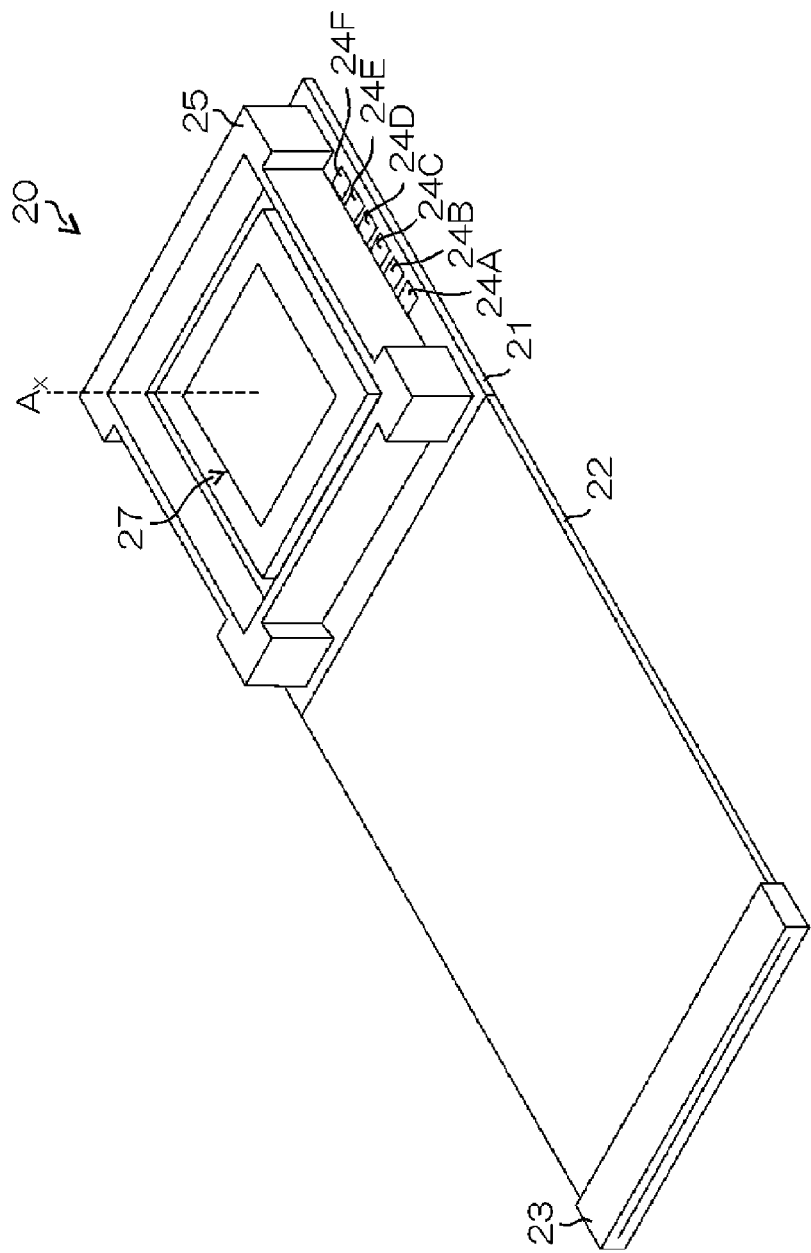
FIG. 2 is a perspective view of the exterior of an imaging device unit.

The imaging module 100 includes a lens unit 10, which includes a lens group 12, and an imaging device unit 20, which includes an imaging device 27 (see FIG. 2). The imaging device 27 captures an image of an object through the lens group 12. In FIG. 1, a direction of an axis perpendicular to an imaging surface of the imaging device 27 is illustrated as a Z direction and two directions perpendicular to the Z direction and perpendicular to each other are illustrated as an X direction and a Y direction. An optical axis Ax of the lens group 12 is tilted toward the Z direction (see FIG. 3) in the state where the lens group 12 is not installed in an electronic device (not illustrated in FIG. 1).

The lens unit 10 includes a housing 11, which accommodates components described below. In an upper surface 11a of the housing 11, an opening 11b, which uses the optical axis Ax of the lens group 12 as its center, is formed. The imaging module 100 captures images by taking object light into the lens group 12 through the opening 11b.

Positioning recessed portions 95A, 95B, and 95C for holding the lens unit 10 in the manufacturing device during manufacturing of the imaging module 100 are formed in the upper surface 11a. Recessed portions 95A1 and 95C1, smaller than the respective recessed portions 95A and 95C, are formed in the bottom surfaces of the recessed portions 95A and 95C, which are disposed on a diagonal line of the upper surface 11a.

A flexible board 13 accommodated in the housing 11 is partially exposed to the outside of the housing 11. A lens-unit terminal unit 14 including terminals 14A to 14F is connected to an end portion of the exposed portion of the flexible board 13. The lens-unit terminal unit 14 is exposed from the surfaces of the housing 11 other than the upper surface 11a. As described below, the lens-unit terminal unit 14 includes terminals other than the terminals 14A to 14F. However, for simplicity, FIG. 1 illustrates only the terminals 14A to 14F and does not include illustrations of other terminals.

FIG. 2 is a perspective view of the exterior of the imaging module 100 illustrated in FIG. 1 from which the lens unit 10 is omitted.

As illustrated in FIG. 2, the imaging device unit 20 includes a substrate 21, on which an imaging device 27 such as a charge coupled device (CCD) image sensor or a complementary metal oxide semiconductor (CMOS) image sensor is mounted, and a flexible board 22, electrically connected to the substrate 21.

Although the pixel pitch of the imaging device 27 is not limited to a particular pixel pitch, an imaging device having a pixel pitch of 1.0 μm or smaller is used in this embodiment. Here, the pixel pitch represents the smallest distance among center-to-center distances between photoelectric conversion regions contained in pixels included in the imaging device 27.

With a recent increase in number of pixels, the pixel pitch of an imaging device has been decreasing. Decreasing of the pixel pitch results in a reduction of the area per pixel. This reduces the radius of a permissible circle of confusion and a depth of focus. In addition, with a need for increasing the amount of light condensed per pixel, the f-number of a lens is likely to decrease. Because of these reasons, recent imaging modules have a very shallow depth of focus and thus the positions of the lens unit and the imaging device unit are required to be determined with high accuracy. When the pixel pitch is 1.0 μm or smaller, extremely high positioning accuracy is required.

A tube-shaped base member 25 having an opening corresponding to the imaging device 27 is disposed on the substrate 21 and the imaging device 27 is disposed inside the base member 25. A cover glass piece 26 (see FIG. 3) is fitted into the hollow portion of the base member 25 above the imaging device 27.

At a portion on the surface of the substrate 21 located out of the base member 25, an imaging-device-unit terminal unit 24 (see FIG. 1) including terminals 24A to 24F for electrical connection with the lens unit 10 is disposed. As in the case of the lens-unit terminal unit 14, only some of terminals of this imaging-device-unit terminal unit 24 are illustrated.

On the substrate 21, an imaging-device wire that is to be connected to terminals such as a data-output terminal and a driving terminal of the imaging device 27 is disposed. The imaging-device wire is connected to an external connection terminal unit 23, disposed at an end portion of the flexible board 22, by way of a wire disposed at the flexible board 22. The external connection terminal unit 23 functions as an electrical connection portion that is electrically connected to the imaging device 27.

A lens-unit wire connected to each terminal in the imaging-device-unit terminal unit is also disposed on the substrate 21. The lens-unit wire is connected to the external connection terminal unit 23, disposed at the end portion of the flexible board 22, by way of the wire disposed at the flexible board 22.

In the state where the lens unit 10 and the imaging device unit 20 are fixed to each other, each terminal of the lens-unit terminal unit and the corresponding terminal of the imaging-device-unit terminal unit are electrically connected to each other. For example, in FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
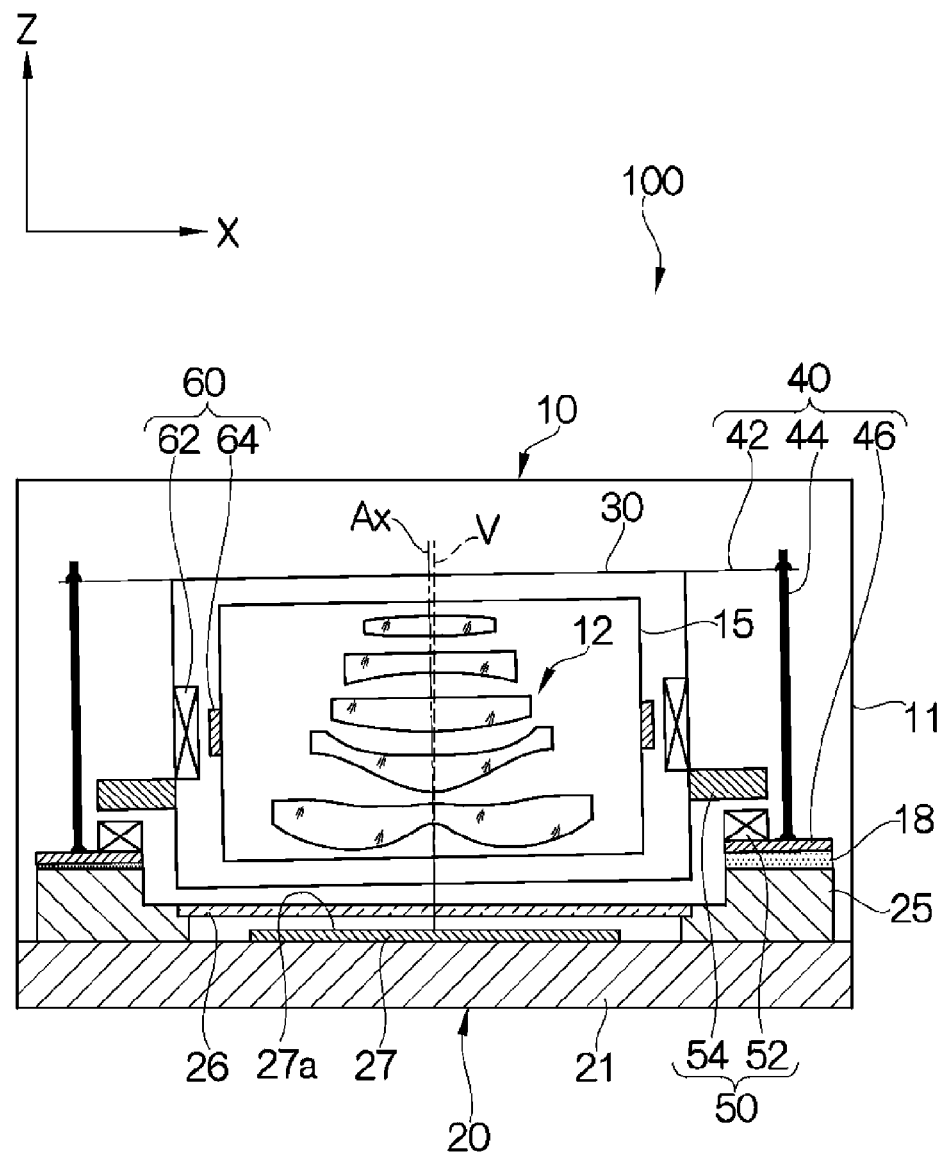
FIG. 3 is a cross-sectional view of the imaging module illustrated in FIG. 1 taken along line III-III.

FIG. 3 is a cross-sectional view of the imaging module 100 illustrated in FIG. 1 taken along line A-A. As illustrated in FIG. 3, the imaging device 27 is disposed on the substrate 21 and sealed with the base member 25, disposed on the substrate 21, and the cover glass piece 26, fitted to the base member 25.

The lens unit 10 includes a lens group 12, including multiple (five in the example illustrated in FIG. 3) lenses disposed above the cover glass piece 26, a tube-shaped lens barrel 15, which supports the lens group 12, a movable image-stabilizing unit 30, an elastic support unit 40, which supports the movable image-stabilizing unit 30 such that the movable image-stabilizing unit 30 is movable in directions perpendicular to the optical axis Ax of the lens group 12 and tiltable around axes perpendicular to the optical axis Ax, an OIS mechanism 50, which moves the movable image-stabilizing unit 30 in directions perpendicular to the optical axis, and a focus adjusting mechanism 60, which moves the lens barrel 15 in the direction of the optical axis.

The movable image-stabilizing unit 30 contains the lens barrel 15 and includes, as described below in detail, a magnetic member such as a magnet. Although not illustrated, an opening that allows object light to pass through the lens group 12 is formed in the upper surface of the movable image-stabilizing unit 30.

The elastic support unit 40 includes a leaf spring 42, extending sideward of the movable image-stabilizing unit 30, four suspension wires 44, each having one end portion fixed to the leaf spring 42 and the other end portion fixed to a portion near the base member 25, and a wire fixing unit 46, to which the other end portion of each suspension wire 44 is fixed and which is fixed onto the base member 25 with adhesion.

The OIS mechanism 50 includes OIS driving coils 52, fixed to a portion near the base member 25 (stationary side), and OIS driving magnets 54, fixed to a portion near the movable image-stabilizing unit 30 (movable side). Together with an AF magnet 64, described below, the OIS driving magnets 54 correspond to magnetic members of the present invention. The lens unit 10 may be provided with other magnetic members.

FIG. 3 illustrates a pair of OIS driving coils 52 and a pair of OIS driving magnets 54 opposing in an X direction (lateral direction in the drawing) of an three-axis orthogonal coordinate system in which the direction perpendicular to an imaging surface 27a of the imaging device 27 (direction indicated with dotted line V) is defined as the Z-axis. However, a pair of OIS driving coils and a pair of OIS driving magnets are also disposed so as to oppose in the Y direction (in the direction perpendicular to the plane of the drawing). Image stabilization can be performed by driving the OIS driving coils in the X direction and the Y direction and moving the movable image-stabilizing unit 30 in the directions perpendicular (including substantially perpendicular) to the optical axis Ax.

The focus adjusting mechanism 60 includes a voice coil motor including an autofocus (AF) coil 62, disposed inside the movable image-stabilizing unit 30, and an AF magnet 64, disposed around the lens barrel 15. The focus adjusting mechanism 60 can perform focus adjustment by driving the voice coil motor and moving the lens barrel 15 in the optical axis direction.

The OIS mechanism 50 and the focus adjusting mechanism 60 each include Hall devices serving as position sensors that detect the position of the lens group 12 (lens barrel 15) in the XYZ directions.

By fixing the wire fixing unit 46 of the lens unit 10 to the base member 25 on the imaging device unit 20 with an adhesive 18 (here, an ultraviolet cure adhesive as an example), the lens unit 10 and the imaging device unit 20 are fixed to each other, so that the imaging module 100 is manufactured. At the manufacture of the imaging module 100, the amount of tilt by which and the direction of tilt in which the movable image-stabilizing unit 30 is tilted in the state where the lens unit 10 is installed in an electronic device including a magnetic-field generating unit have been acquired in advance. On the basis of the amount of tilt and the direction of tilt acquired in advance, the lens unit 10 and the imaging device unit 20 are fixed to each other with adhesion in the state where the optical axis Ax of the lens group 12 is tilted by the above-described amount of tilt in the direction opposite to the above-described direction of tilt from a first reference position perpendicular to the imaging surface 27a (position in which the optical axis Ax is parallel to dotted line V, perpendicular to the imaging surface 27a in the drawing) in the state where the magnetic field is not applied thereto from the magnetic-field generating unit.

<Configuration of Electrical Connection between OIS Mechanism and Focus Adjusting Mechanism>

Figure 4:
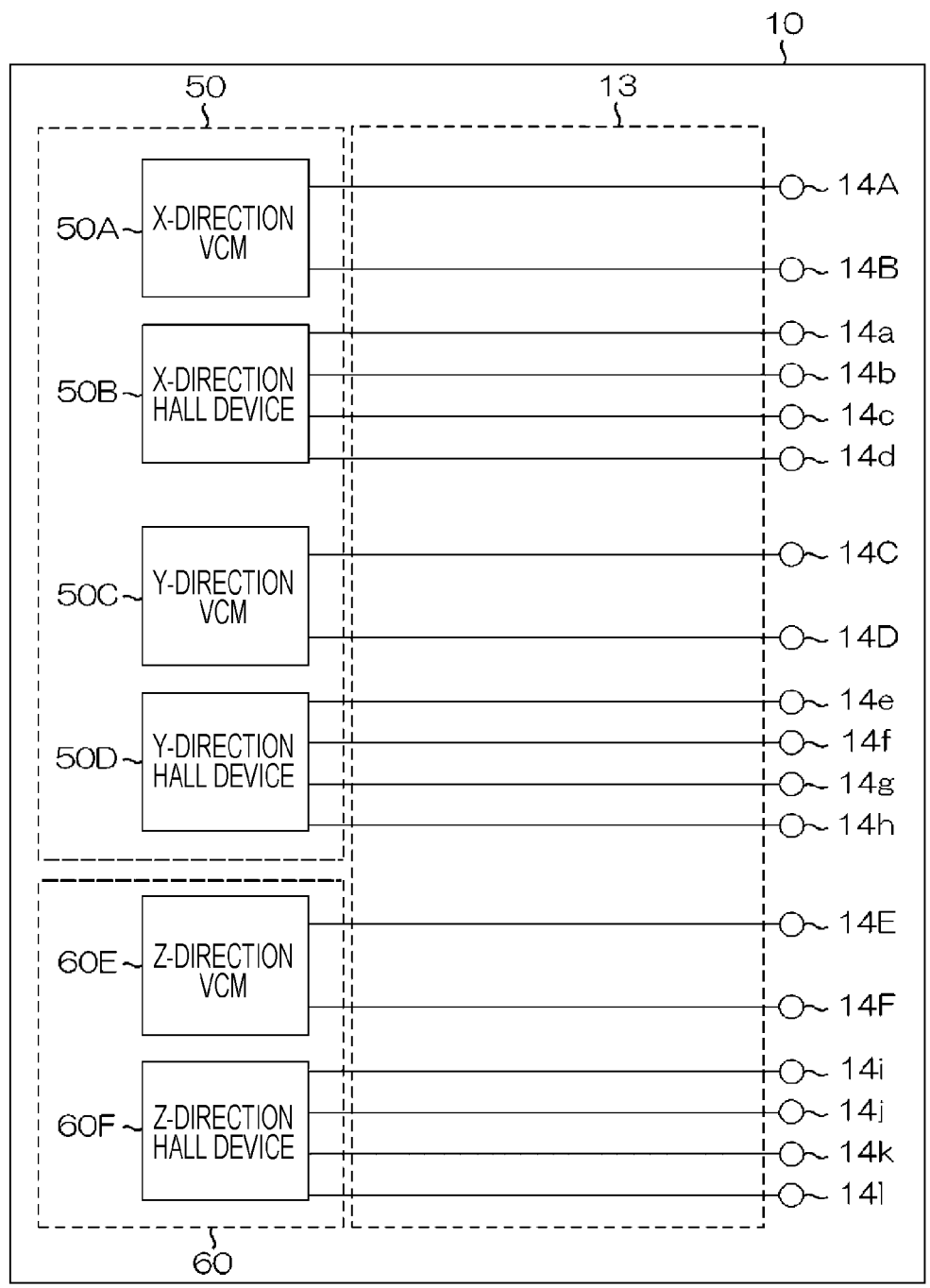
FIG. 4 is a block diagram illustrating an electric connection configuration of an OIS mechanism and a focus adjusting mechanism.

FIG. 4 is a block diagram illustrating a configuration of electrical connection between the OIS mechanism 50 and the focus adjusting mechanism 60 illustrated in FIG. 3.

As illustrated in FIG. 4, the OIS mechanism 50 includes a voice coil motor 50A (the OIS driving coils 52 and the OIS driving magnets 54 illustrated in FIG. 3, hereinafter abbreviated to an X-direction VCM 50A), which moves the movable image-stabilizing unit 30 in the X direction, an X-direction Hall device 50B, which detects the position of the movable image-stabilizing unit 30 in the X direction, a voice coil motor 50C (hereinafter abbreviated to a Y-direction VCM 50C), which moves the movable image-stabilizing unit 30 in the Y direction, and a Y-direction Hall device 50D, which detects the position of the movable image-stabilizing unit 30 in the Y direction.

The focus adjusting mechanism 60 includes a voice coil motor 60E (the AF coils 62 and the AF magnets 64 illustrated in FIG. 3, hereinafter abbreviated to a Z-direction VCM 60E), which moves the lens group 12 (lens barrel 15) in the optical axis direction relative to the movable image-stabilizing unit 30, and a Z-direction Hall device 60F, which detects the position of the lens barrel 15 in the Z direction.

The X-direction VCM 50A includes two terminals, which are electrically connected to a terminal 14A and a terminal 14B, respectively, by way of wires formed at the flexible board 13.

The X-direction Hall device 50B includes four terminals, which are electrically connected to a terminal 14a, a terminal 14b, a terminal 14c, and a terminal 14d by way of wires formed at the flexible board 13.

The Y-direction VCM 50C includes two terminals, which are electrically connected to a terminal 14C and terminal 14D by way of wires formed at the flexible board 13.

The Y-direction Hall device 50D includes four terminals, which are electrically connected to a terminal 14e, a terminal 14f, a terminal 14g, and a terminal 14h, respectively, by way of wires formed at the flexible board 13.

The Z-direction VCM 60E includes two terminals, which are electrically connected to a terminal 14E and a terminal 14F, respectively, by way of wires formed at the flexible board 13.

The Z-direction Hall device 60F includes four terminals, which are electrically connected to a terminal 14i, a terminal 14j, a terminal 14k, and a terminal 14l, respectively, by way of wires formed at the flexible board 13.

In this manner, the terminals of the lens-unit terminal unit 14 function as electrical connection portions electrically connected to the OIS mechanism 50 and the focus adjusting mechanism 60 of the lens unit 10. Here, the number of terminals required for each Hall device of the OIS mechanism 50 and the focus adjusting mechanism 60 is taken as an example and not limited to the above-described configuration.

[Imaging-Module Manufacturing Method According to First Embodiment]

Referring now to FIG. 5 to FIG. 10, a method for manufacturing the imaging module 100 having the above-described configuration, particularly, an operation of fixing the lens unit 10 and the imaging device unit 20 to each other is described.

<Acquirement of Direction of Tilt and Amount of Tilt>

Figure 5:
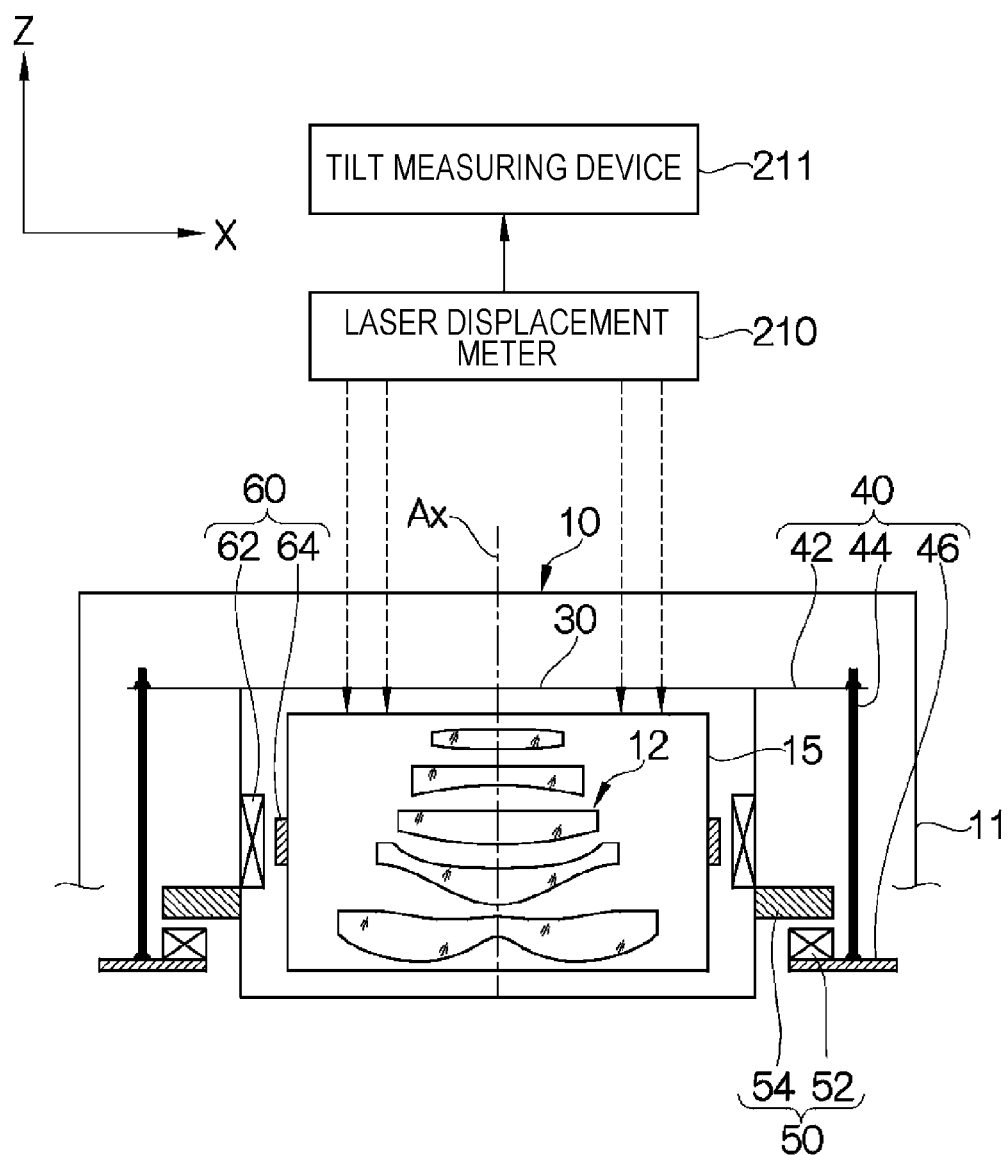
FIG. 5 illustrates measurement of the direction of tilt and the amount of tilt of the movable image-stabilizing unit in the state before a lens unit is installed in the electronic device.
Figure 6:
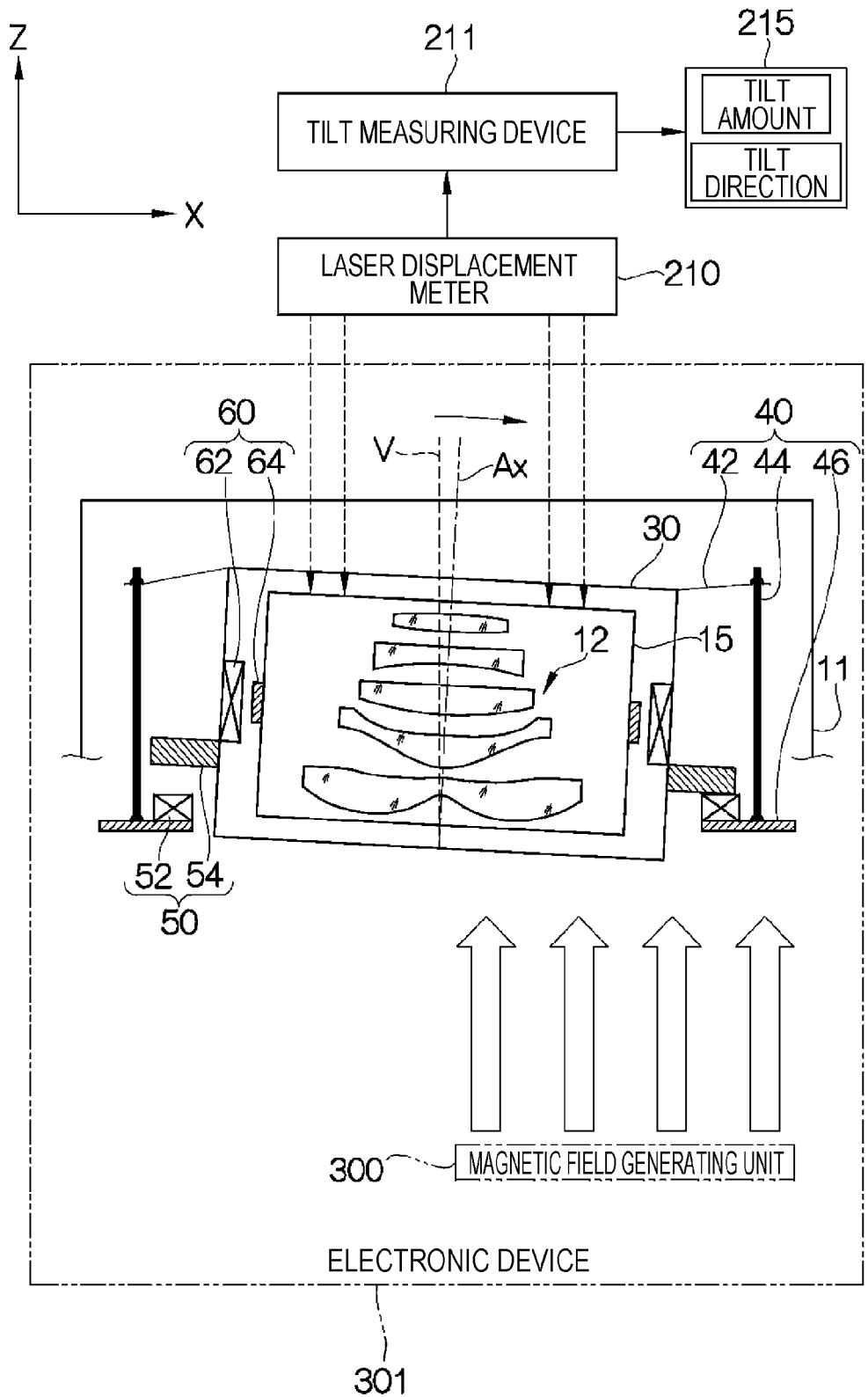
FIG. 6 illustrates measurement of the direction of tilt and the amount of tilt of the movable image-stabilizing unit in the state where a lens unit is installed in the electronic device.

As illustrated in FIG. 5 and FIG. 6, before the lens unit 10 and the imaging device unit 20 are fixed to each other, the amount of tilt by which and the direction of tilt in which the movable image-stabilizing unit 30 is tilted in the state where the lens unit 10 is installed in an electronic device 301 including a magnetic-field generating unit 300 are acquired in advance. Here, the amount of tilt and the direction of tilt may be acquired in the state where the lens unit 10 is fixed to the imaging device unit 20.

Firstly, as illustrated in FIG. 5, the direction of tilt and the amount of tilt of the upper surface of the lens barrel 15 of the lens unit 10 with respect to the Z-axis are measured in the state before the lens unit 10 is installed in the electronic device 301, that is, in the state where the magnetic field is not applied to the lens unit 10 from the magnetic-field generating unit 300. Specifically, the height of the upper surface of the lens barrel 15 at four portions (such as four corners, or may be three or more portions) exposed through the opening 11b or the opening of the movable image-stabilizing unit 30 is measured using a laser displacement meter 210. The measurement results of the laser displacement meter 210 are output to a tilt measuring device 211. Here, instead of the laser displacement meter 210, various other displacement meters such as a contact displacement meter may be used.

Subsequently, as illustrated in FIG. 6, in actual operation conditions in which the lens unit 10 is installed in the electronic device 301, the direction of tilt and the amount of tilt of the upper surface of the lens barrel 15 with respect to the Z-axis are measured. Specifically, as in the case of a measurement in which the magnetic field is not applied, the height of the upper surface of the lens barrel 15 is measured at four portions using the laser displacement meter 210 and the measurement results of the laser displacement meter 210 are output to the tilt measuring device 211.

Figure 27:
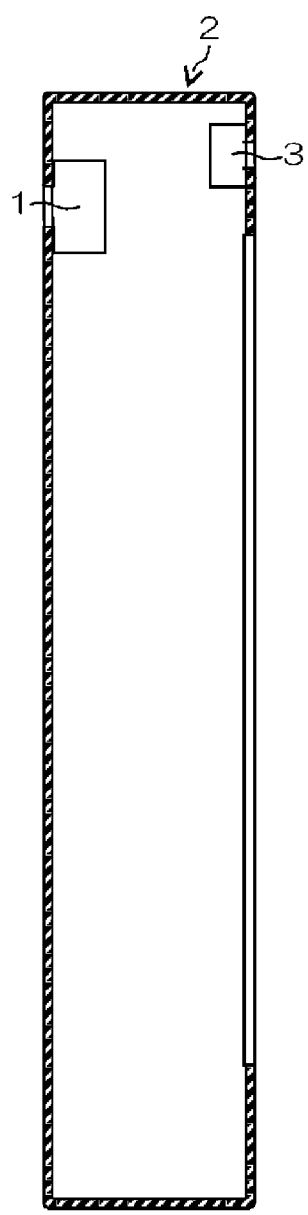
FIG. 27 is a cross-sectional view of a main portion of a smartphone when an imaging module is installed in the smartphone.

At this time, in the actual operation conditions, a magnetic field is applied to the lens unit 10 from the magnetic-field generating unit 300 disposed near the lens unit 10 (for example, from a speaker in the case where the electronic device 301 is a smartphone, see FIG. 27). The movable image-stabilizing unit 30 supported by the elastic support unit 40 is tiltable around axes perpendicular to the optical axis Ax. Thus, due to the magnetic field being applied from the magnetic-field generating unit 300, the movable image-stabilizing unit 30 is displaced from the state where the magnetic field is not applied, specifically, tilted. In addition, due to the magnetic field, the movable image-stabilizing unit 30 is, in some cases, translated in the Z direction while being tilted. The wording "the magnetic-field generating unit 300 disposed near" here represents the magnetic-field generating unit 300 disposed within such a range that affects the position of the movable image-stabilizing unit 30. This range expands or contracts depending on factors such as the intensity of the magnetic field produced from the magnetic-field generating unit 300.

The tilt measuring device 211 compares measurement results (for example, calculates the difference) from the laser displacement meter 210 in the state where the lens unit 10 is not installed in the electronic device 301 and in the state where the lens unit 10 is installed in the electronic device 301 and calculates tilt measurement results 215 that represent a change of the position of the movable image-stabilizing unit 30 before and after the installation. The tilt measurement results 215 include the direction of tilt in which and the amount of tilt by which the movable image-stabilizing unit 30 is tilted. Thus, the direction of tilt in which and the amount of tilt by which the movable image-stabilizing unit 30 is tilted by the effect of the magnetic field applied from the magnetic-field generating unit 300 are acquired. Here, imaging modules 100 of the same model installed in electronic devices 301 of the same model yield basically the same tilt measurement results 215. Thus, acquirement of the tilt measurement results 215 for each combination of the electronic device 301 of a specific model and the imaging module 100 of a specific model will suffice.

In this embodiment, the laser displacement meter 210 performs measurements in the state where the lens unit 10 is installed in the electronic device 301. However, the laser displacement meter 210 may perform measurements without the lens unit 10 being installed in the electronic device 301 and while the magnetic-field generating unit 300 or another member such as a magnetic member corresponding to the magnetic-field generating unit 300 is disposed at a predetermined position relative to the lens unit 10. The "predetermined position" here is a position at which the lens unit 10, while being installed in the electronic device 301, is capable of applying, to the movable image-stabilizing unit 30, a magnetic field having a magnitude equal to the magnitude of the magnetic field applied from the magnetic-field generating unit 300 to the movable image-stabilizing unit 30.

<Configuration of Imaging-Module Manufacturing Device>

Figure 7:
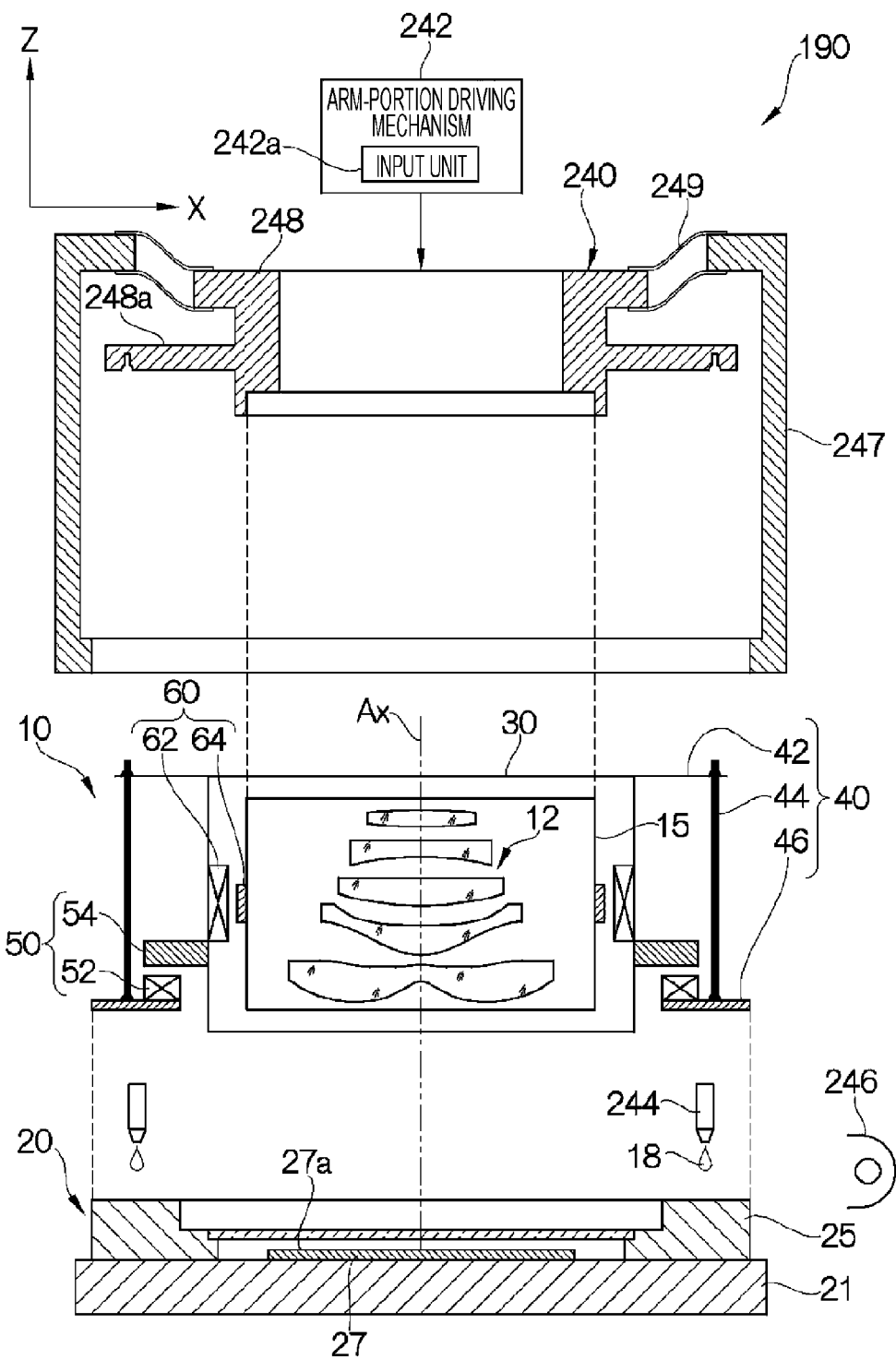
FIG. 7 is a schematic diagram of an imaging-module manufacturing device according to a first embodiment.
Figure 8:
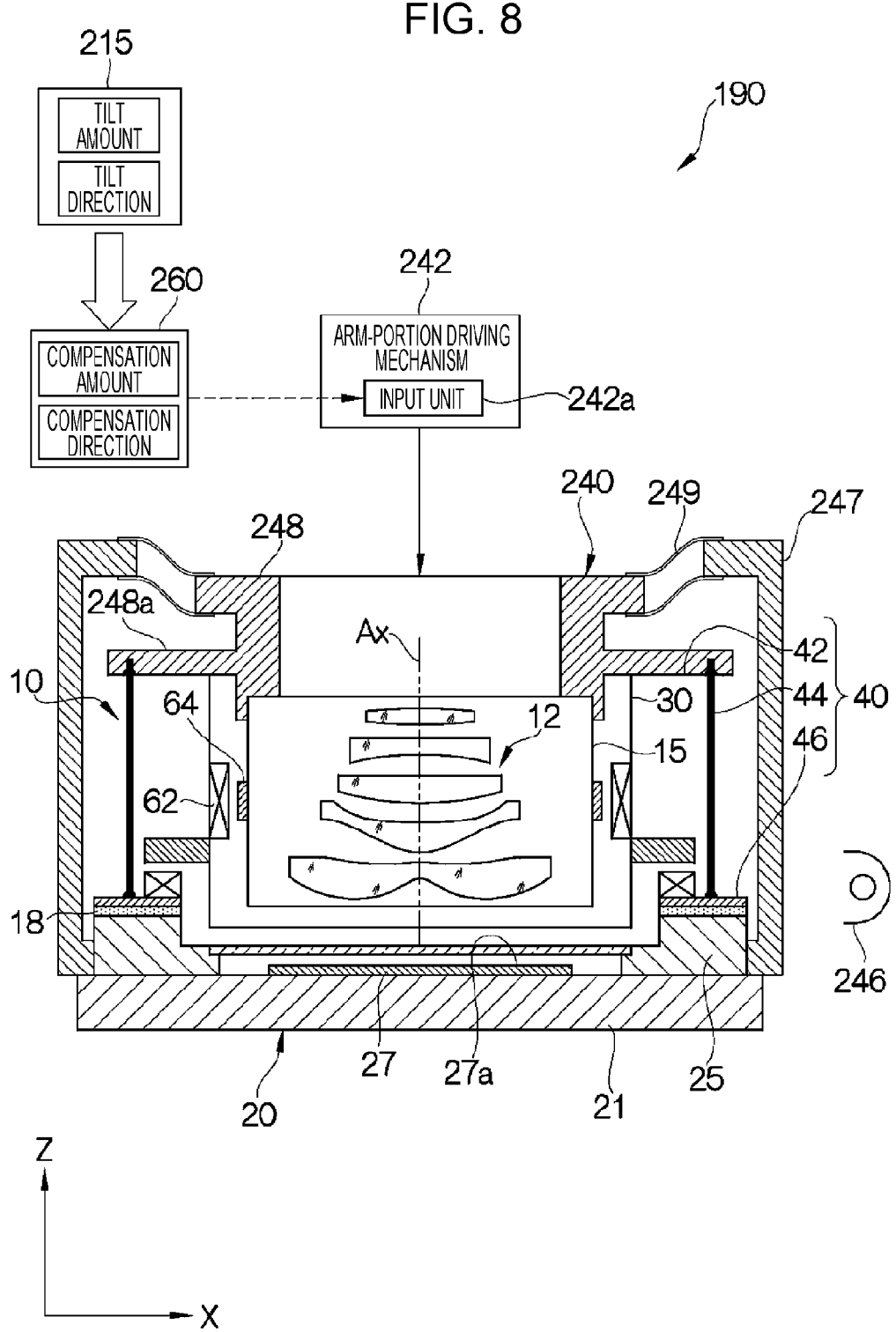
FIG. 8 is an illustration illustrating an operation of the imaging-module manufacturing device according to the first embodiment performed when fixing the lens unit and the imaging device unit to each other.

As illustrated in FIG. 7 and FIG. 8, after the tilt measurement results 215 are acquired or in the case where the tilt measurement results 215 have already been acquired, the lens unit 10 and the imaging device unit 20 are fixed to each other using an imaging-module manufacturing device 190. In FIG. 7 and FIG. 8, an illustration of the housing 11 is omitted for preventing the drawings from becoming complicated. However, the housing 11 may be attached to the imaging module 100 after the lens unit 10 and the imaging device unit 20 are fixed to each other.

The imaging-module manufacturing device 190 adjusts the position and tilt of the lens unit 10 relative to the imaging device unit 20, fixes the lens unit 10 to the imaging device unit 20 after this adjustment, and completes the imaging module 100. The imaging-module manufacturing device 190 roughly includes a fixing jig 240, an arm-portion driving mechanism 242, adhesive supplying portions 244, and an ultraviolet lamp 246.

The fixing jig 240 includes a ring-shaped base 247, having a hollow portion, a ring-shaped arm portion 248, and a support spring 249. The base 247 is fixed to, for example, the imaging device unit 20 or a stage, not illustrated, on which the imaging device unit 20 is disposed.

The arm portion 248 firmly holds an upper surface portion of the lens barrel 15 (or may be the movable image-stabilizing unit 30) so as to allow the upper surface portion to be attachable and detachable through the opening 1lb and the opening of the movable image-stabilizing unit 30. A ring-shaped contact portion 248a, which comes into contact with the upper surface portion of the elastic support unit 40 when the arm portion 248 firmly holds the lens barrel 15, is disposed on the outer periphery of the arm portion 248. This configuration allows the movable image-stabilizing unit 30 and the elastic support unit 40 to be integrally subjected to a tilt adjustment by way of the arm portion 248.

The support spring 249 supports the arm portion 248 in the hollow portion of the base 247 so that the arm portion 248 is movable in the directions of the XYZ axes and supports the arm portion 248 such that the arm portion 248 is tiltable around each of the XY axes (that is, adjustable so as to tilt).

The arm-portion driving mechanism 242 is connected to the arm portion 248. The arm-portion driving mechanism 242 shifts the arm portion 248 in the directions of the XYZ axes and tilts the arm portion 248 around each of the XY axes.

The arm-portion driving mechanism 242 includes an input unit 242a. Compensation values 260 acquired from the tilt measurement results 215 are input to the input unit 242a. The compensation values 260 are compensation values for adjusting the position of the lens group 12 (here, the movable image-stabilizing unit 30 and the elastic support unit 40) so that the optical axis Ax of the lens group 12 becomes perpendicular to the imaging surface 27a from the state where the movable image-stabilizing unit 30 is tilted by the effect of the magnetic field applied from the magnetic-field generating unit 300. These compensation values 260 include a compensation direction, indicating a direction opposite to the direction of tilt indicated by the tilt measurement result 215, and a compensation amount, indicating the amount of tilt equal to the amount of tilt indicated by the tilt measurement result 215. On the basis of the compensation values 260 input to the input unit 242a, the arm-portion driving mechanism 242 tilts the arm portion 248 around each of the XY axes, so as to tilt the movable image-stabilizing unit 30 and the elastic support unit 40 by the amount of tilt in the direction opposite to the direction of tilt indicated by the tilt measurement result 215.

The adhesive supplying portions 244 supply an ultraviolet curable adhesive 18 to spaces between the wire fixing unit 46 and the base member 25. The positions of the adhesive supplying portions 244 are not limited to the illustrated positions. The adhesive supplying portions 244 are disposed at any positions between the wire fixing unit 46 and the base member 25 at which the adhesive supplying portions 244 are capable of supplying the adhesive 18. In the case where the adhesive supplying portions 244 are disposed at the positions illustrated in FIG. 7, the adhesive supplying portions 244 are retracted from the positions between the wire fixing unit 46 and the base member 25 after supplying the adhesive 18.

The ultraviolet lamp 246 applies ultraviolet rays to the adhesive 18 to cause the adhesive 18 to cure. The position of the ultraviolet lamp 246 is not limited to the illustrated position. The ultraviolet lamp 246 is disposed at any position between the wire fixing unit 46 and the base member 25 at which the ultraviolet lamp 246 is capable of applying ultraviolet rays to the adhesive 18.

<Operation of Fixing Lens Unit and Imaging Device Unit to Each Other>

Subsequently, an example of an operation of fixing the lens unit 10 and the imaging device unit 20 to each other performed by the imaging-module manufacturing device 190 (fixing step in the present invention) is described. Firstly, the arm portion 248 of the fixing jig 240 is caused to firmly hold the upper surface portion of the lens barrel 15 and the contact portion 248a is brought into contact with the upper surface portion of the elastic support unit 40. Thereafter, the arm-portion driving mechanism 242 is controlled, so that the arm portion 248 performs tilt adjustment so that the optical axis Ax of the lens group 12 is in the first reference position (see FIG. 7) perpendicular to the imaging surface 27a, and then the position of the arm portion 248 in the XY directions is adjusted so that the optical axis Ax coincides with the center position of the imaging surface 27a or a predetermined reference position.

Subsequently, the adhesive supplying portions 244 are operated to supply the adhesive 18 to portions between the wire fixing unit 46 and the base member 25. In addition, the arm-portion driving mechanism 242 is controlled so that the movable image-stabilizing unit 30 and the elastic support unit 40 (that is, the lens unit 10) are shifted toward the imaging device unit 20 in the Z direction. Then, the operation of the arm-portion driving mechanism 242 is temporarily halted in the state where the wire fixing unit 46 is in contact with or in pressure contact with the base member 25 and then the compensation value 260 is input to the input unit 242a.

Figure 9:
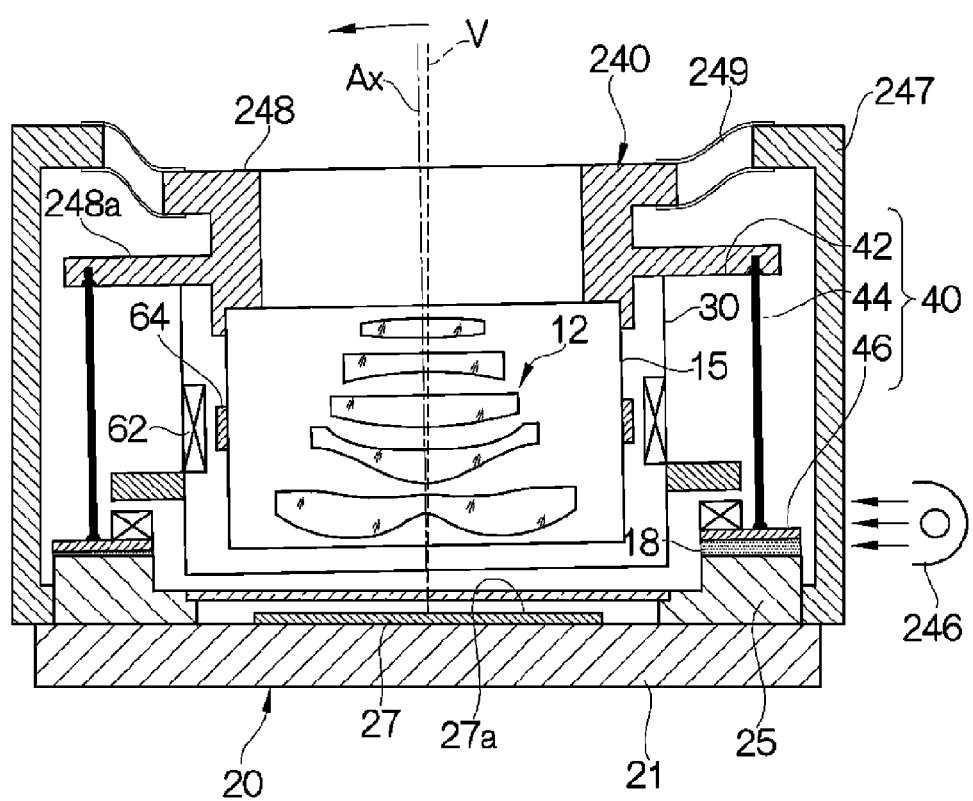
FIG. 9 is an illustration illustrating an adjustment of tilt of the movable image-stabilizing unit performed by the imaging-module manufacturing device according to the first embodiment.

On the basis of the compensation value 260, the arm-portion driving mechanism 242 tilts the arm portion 248 around each of the XY axes such that the movable image-stabilizing unit 30 and the elastic support unit 40 are tilted in the compensation direction by the compensation amount as illustrated in FIG. 9 (FIG. 9 omits the illustration of the imaging-module manufacturing device 190). As a result, the lens group 12 is tilted from the above-described first reference position by the amount of tilt in the direction opposite to the direction of tilt indicated by the tilt measurement result 215. This tilt adjustment renders the thickness of the adhesive 18 between the wire fixing unit 46 and the base member 25 nonuniform.

Subsequently, ultraviolet rays are applied from the ultraviolet lamp 246 toward the adhesive 18 between the wire fixing unit 46 and the base member 25. Thus, the adhesive 18 is cured while having the nonuniform thickness and the lens unit 10 and the imaging device unit 20 are fixed to each other while the lens group 12 is being tilted from the above-described first reference position.

Figure 10:
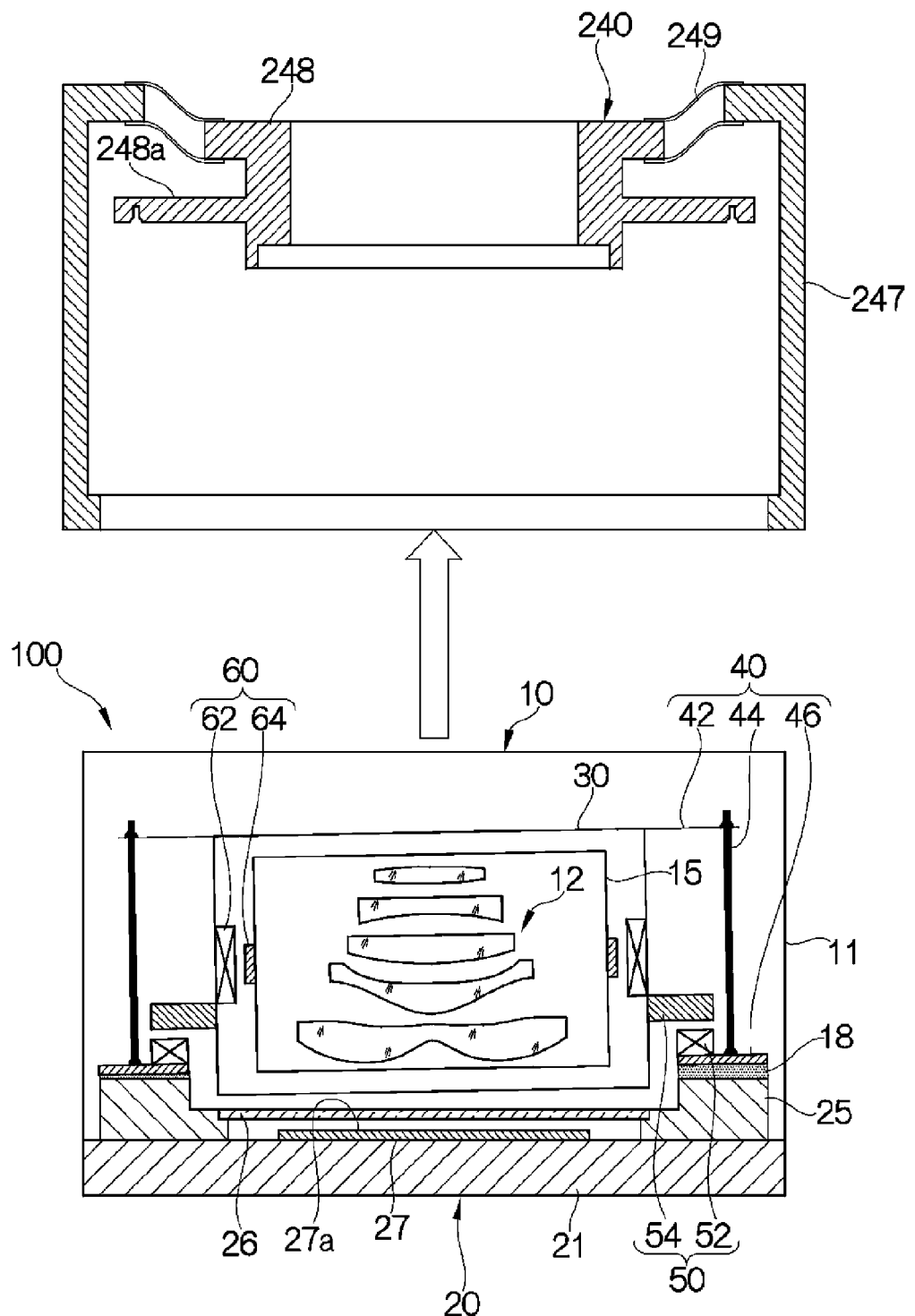
FIG. 10 is an illustration illustrating removal of the imaging-module manufacturing device according to the first embodiment.

As illustrated in FIG. 10, after the lens unit 10 and the imaging device unit 20 are fixed to each other, the fixing jig 240 is removed after the arm portion 248 is caused to let go of the lens barrel 15. Thus, the operation of the imaging-module manufacturing device 190 of fixing the lens unit 10 and the imaging device unit 20 together is finished, so that the imaging module 100 is complete.

Here, the imaging-module manufacturing device 190 described in the first embodiment is an example. The invention is not particularly limited to this device and may be any device as long as the device is capable of tilting the lens group 12 from the first reference position when the lens unit 10 and the imaging device unit 20 are to be fixed together. The wording "tilting the lens group 12 from the first reference position" here includes the case where the imaging device unit 20 is tilted relative to the lens group 12. In other words, the lens group 12 suffices if it is tilted relative to the imaging device unit 20 from the first reference position.

<Effects of the Present Invention>

Figure 11:
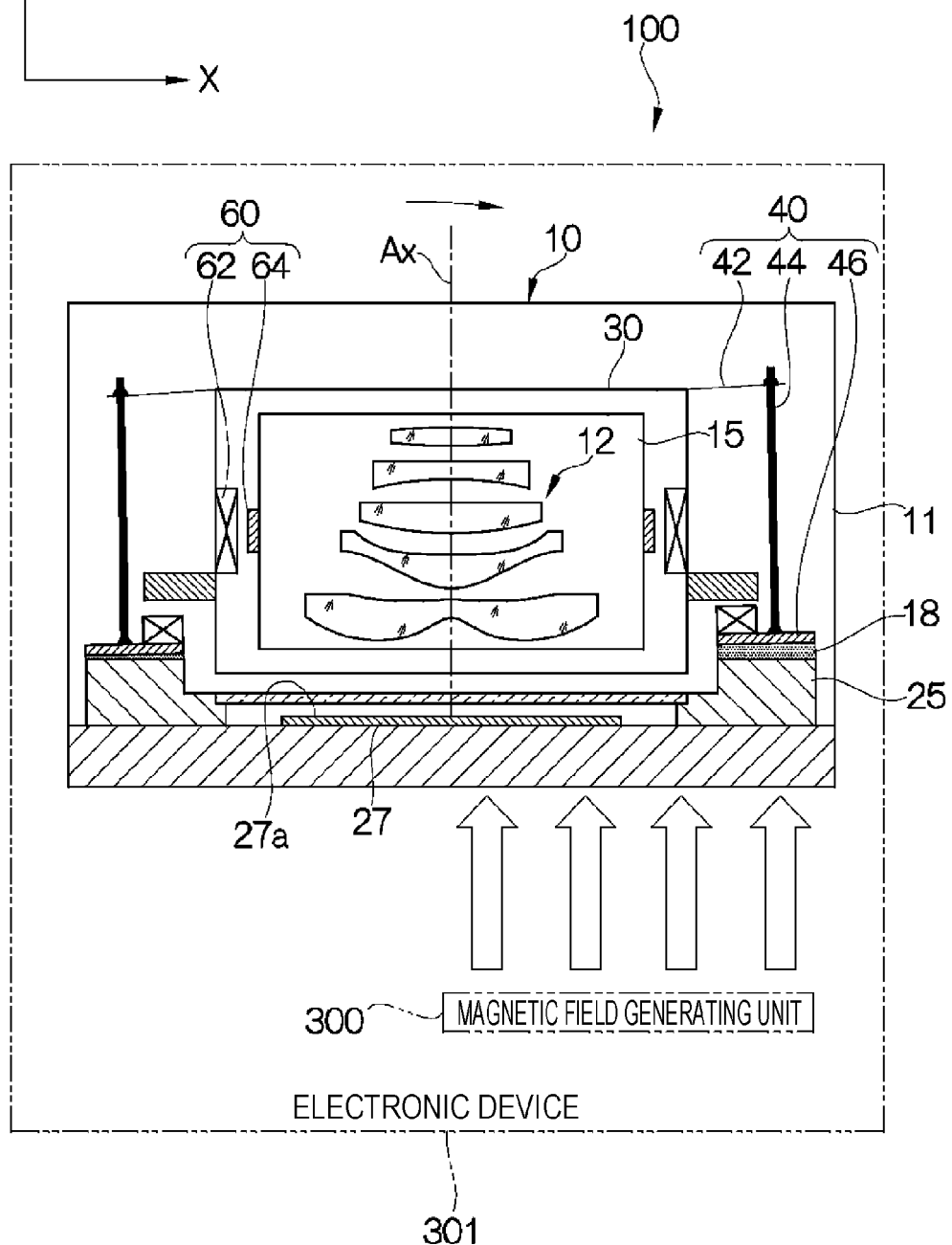
FIG. 11 is an illustration illustrating an imaging module in the state of being installed in an electronic device.

In the imaging module 100 manufactured by the present invention in the above-described manner, the lens unit 10 and the imaging device unit 20 are fixed together in the state where the lens group 12 is tilted from the above-described first reference position by the amount of tilt in the direction opposite to the direction of tilt indicated by the tilt measurement result 215. Thus, as illustrated in FIG. 11, when the imaging module 100 is installed in an electronic device 301, the movable image-stabilizing unit 30 is tilted by the amount of tilt in the direction of tilt indicated by the above-described tilt measurement result 215 due to a magnetic field applied from the magnetic-field generating unit 300 to the lens unit 10. As a result, the optical axis Ax of the lens group 12 is rendered perpendicular to the imaging surface 27*a,* that is, the lens group 12 is adjusted to be in the first reference position. This configuration can prevent the lens group 12 from tilting from the first reference position even when the imaging module 100 is disposed near a magnetic-field generating unit 300 in the electronic device 301. Thus, the flexibility of disposition of components in the electronic device 301 (including the imaging module 100 and the magnetic-field generating unit 300) can be enhanced.

As in a comparative example illustrated in FIG. 12A, when the imaging module manufactured as a result of fixing the lens unit and the imaging device unit together in the state where the lens group 12 is in the first reference position is installed in the electronic device 301, the movable image-stabilizing unit 30 is tilted by the magnetic field applied to the lens unit from the magnetic-field generating unit 300, so that the lens group 12 is tilted from the first reference position. As a result, the resolution over the screen displaying an image obtained by the imaging module varies due to the tilt of the lens group 12 as illustrated in a distribution map of the resolution over the screen. In FIG. 12, the resolution over the screen is expressed with light and shade where a lighter area has a higher resolution.

In contrast to this comparative example, in the present invention as illustrated in FIG. 12B, the lens group 12 is tilted from the first reference position in accordance with the compensation value 260 (tilt measurement result 215) when the lens unit 10 and the imaging device unit 20 are to be fixed together. Thus, when the imaging module 100 is installed in the electronic device 301, the lens group 12 is adjusted to be in the first reference position as a result of the movable image-stabilizing unit 30 being tilted due to the magnetic field being applied from the magnetic-field generating unit 300 to the lens unit 10. Consequently, the distribution of the resolution over the screen displaying an image obtained by the imaging module 100 of the present invention is rendered uniform, whereby a preferable image is obtained.

The lens group 12 of the present invention illustrated in FIG. 12B is an example of a case where the lens group 12 of the comparative example illustrated in FIG. 12A is tilted at 0.26 degrees. In this manner in the present invention, a favorable image in which the distribution of the resolution over the screen is rendered uniform can be obtained by adjusting the tilt of the lens group 12 at 0.2 to 0.3 degrees, which is smaller than 0.6 degrees defined as an allowable value of tilt in the above-described invention described in Japanese Unexamined Patent Application Publication No. JP2012-256017A, although the degrees vary depending on the distance between the magnetic-field generating unit 300 and the lens unit 10 and the intensity of the magnetic field produced by the magnetic-field generating unit 300.

[Imaging-Module Manufacturing Method According to Second Embodiment]

Figure 13:
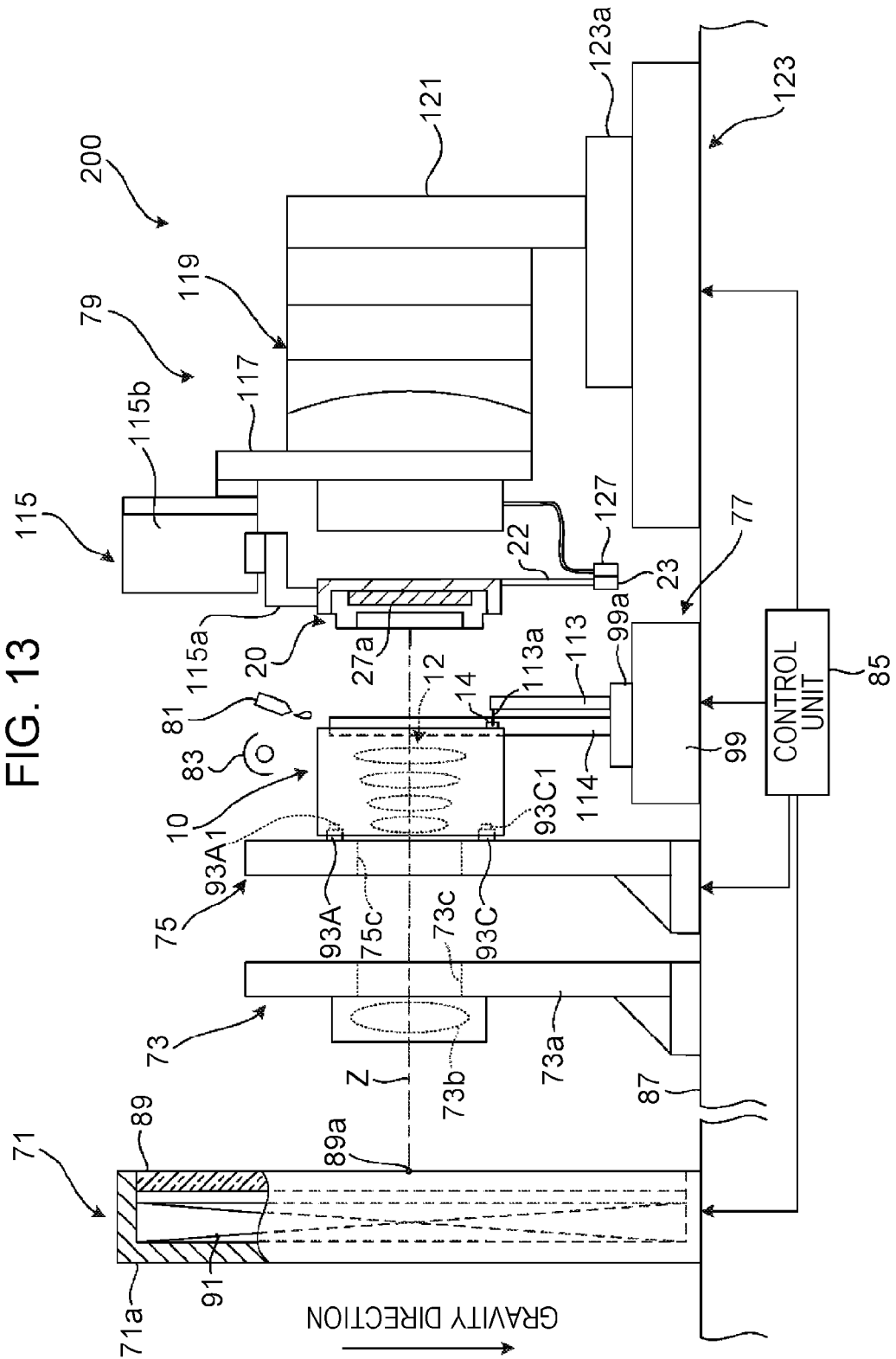
FIG. 13 is a schematic diagram of an imaging-module manufacturing device according to a second embodiment.
Figure 14:
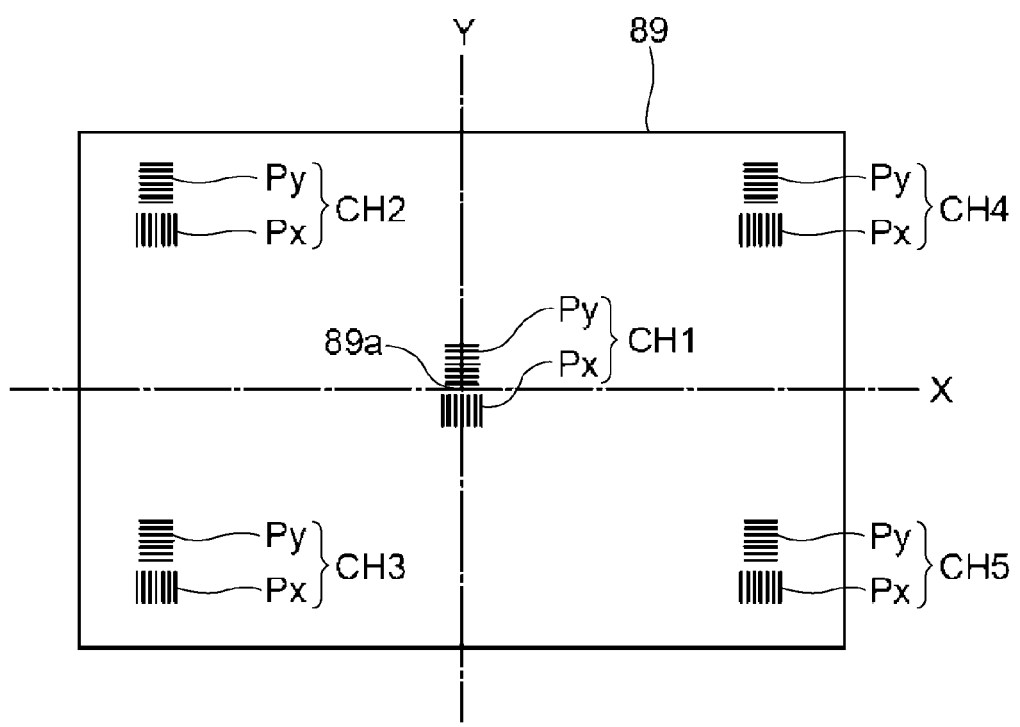
FIG. 14 is a front view of a measurement chart of the imaging-module manufacturing device illustrated in FIG. 13.
Figure 15:
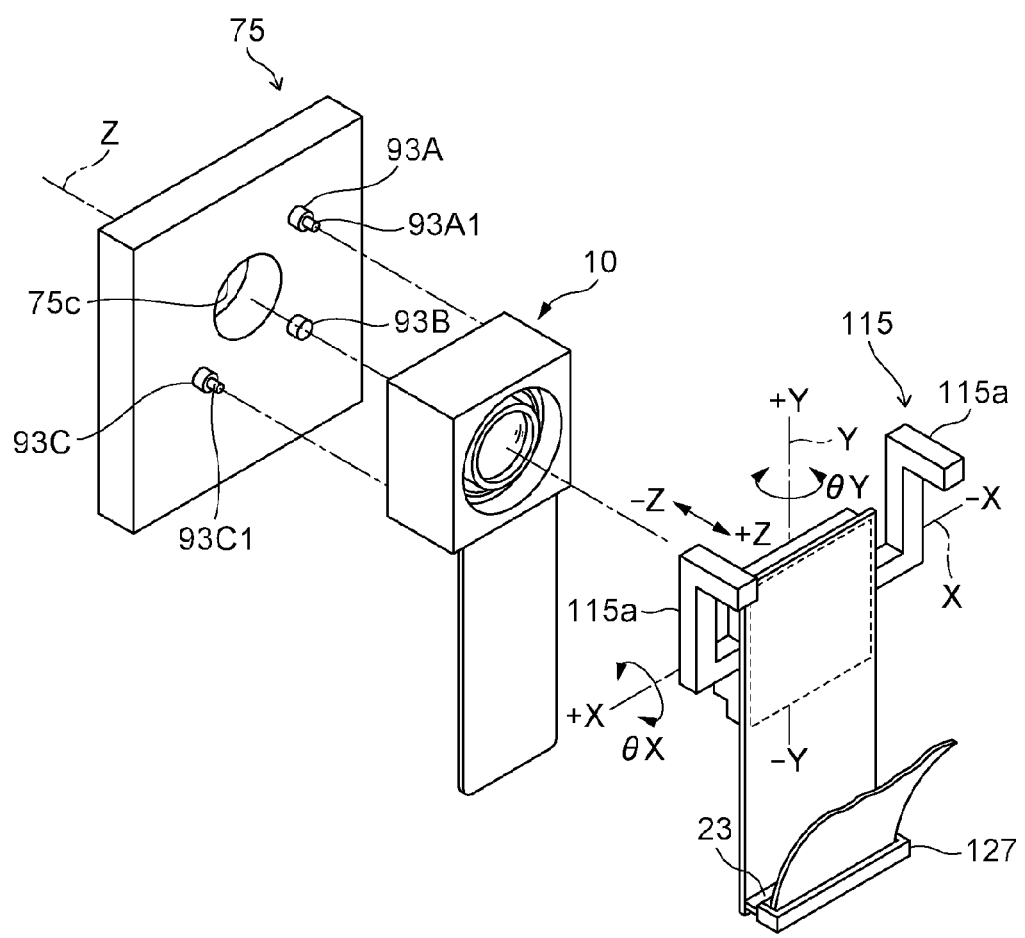
FIG. 15 is an illustration illustrating how the imaging-module manufacturing device according to the second embodiment holds the lens unit and the imaging device unit.

Referring to FIG. 13 to FIG. 15, a method for manufacturing the imaging module 100 according to a second embodiment having the above-described configuration (particularly, an operation of fixing the lens unit 10 and the imaging device unit 20 together) is described now. In the second embodiment, the imaging module 100 is manufactured by using an imaging-module manufacturing device 200 corresponding to an imaging-module manufacturing device according to the present invention. In the imaging-module manufacturing device 190 according to the first embodiment, the lens group 12 is tilted from the first reference position in which the optical axis Ax of the lens group 12 is perpendicular to the imaging surface 27*a*. In contrast, in the imaging-module manufacturing device 200, a lens group 12 is tilted relative to the imaging device unit 20 from a second reference position, which is a position of the lens group 12 in which the resolution at multiple measurement points set on an imaging surface 27*a* of an imaging device 27 is maximized as in the case of the invention described in Japanese Unexamined Patent Application Publication No. JP2010-021985A.

<Configuration of Imaging-Module Manufacturing Device According to Second Embodiment>

FIG. 13 is a schematic diagram of the imaging-module manufacturing device 200. The imaging-module manufacturing device 200 adjusts the position and the tilt of the imaging device unit 20 relative to the lens unit 10 and, after this adjustment, fixes the imaging device unit 20 to the lens unit 10 to complete the imaging module 100.

The imaging-module manufacturing device 200 includes a measurement-chart installation portion 71, a condensing unit 73, a lens positioning plate 75, a lens-unit holding portion 77, an imaging-device-unit holding portion 79, an adhesive supplying portion 81, an ultraviolet lamp 83, serving as a light source, and a control unit 85, which controls these components. The measurement-chart installation portion 71, the condensing unit 73, the lens positioning plate 75, the lens-unit holding portion 77, and the imaging-device-unit holding portion 79 are unidirectionally arranged on a shaft 87 perpendicular to the direction of gravity and perpendicular to a measurement chart 89, described below.

The measurement-chart installation portion 71 includes a box-shaped housing 71*a,* a measurement chart 89, fixed into the housing 71*a,* and a light source 91, which is installed in the housing 71*a* and illuminates the measurement chart 89 with parallel rays from the back surface of the measurement chart 89. The measurement chart 89 is made of, for example, a plastic board having light diffusibility. A chart surface of the measurement chart 89 is parallel to the direction of gravity. The measurement chart 89 may be rendered replaceable with another one by being rendered removable.

In the second embodiment, a perpendicular line that is perpendicular to the chart surface of the measurement chart 89 (perpendicular line parallel to the shaft 87) and that passes a chart surface center 89*a* is defined as a Z-axis and the two axes perpendicular to the Z-axis are defined as a horizontal X-axis and a vertical Y-axis (hereinafter abbreviated to an X-axis and a Y-axis as appropriate, see FIG. 14).

FIG. 14 is a chart surface of the measurement chart 89. The measurement chart 89 is rectangular. Multiple chart images CH1, CH2, CH3, CH4, and CH5 are printed on the chart surface on which chart patterns are provided.

All the multiple chart images are the same image, which is a so-called ladder-shaped chart pattern in which black lines are arranged at a predetermined interval. Each chart image includes a horizontal chart image Px, in which the lines are arranged in the horizontal direction of the image, and a vertical chart image Py, in which the lines are arranged in the vertical direction of the image.

Referring back to FIG. 13, the condensing unit 73 is disposed on the Z-axis so as to face the measurement-chart installation portion 71.

The condensing unit 73 includes a bracket 73a, fixed to the shaft 87, and a condensing lens 73b. The condensing lens 73b condenses light emitted from the measurement-chart installation portion 71 and causes the condensed light to be incident on the lens positioning plate 75 through an opening 73c formed in the bracket 73a.

The lens positioning plate 75 and the lens-unit holding portion 77 hold the lens unit 10 at a position on the Z-axis between the measurement-chart installation portion 71 and the imaging-device-unit holding portion 79. In other words, the lens positioning plate 75 constitutes, together with the lens-unit holding portion 77, a lens-unit holding portion according to the present invention.

The lens positioning plate 75 is formed so as to have rigidity and has an opening 75c that allows light condensed by the condensing unit 73 to pass through an opening 75c. The lens positioning plate 75 is disposed on the Z-axis so as to face the condensing unit 73.

FIG. 15 illustrates how the imaging-module manufacturing device 200 holds the lens unit 10 and the imaging device unit 20.

As illustrated in FIG. 15, three contact pins 93A, 93B, and 93C are disposed around the opening 75c on the surface of the lens positioning plate 75 facing the lens-unit holding portion 77.

The contact pins 93A, 93B, and 93C receive the recessed portions 95A, 95B, and 95C of the lens unit 10 illustrated in FIG. 1 and insertion pins 93A1 and 93C1 are inserted into the recessed portions 95A1 and 95C1, so that the position of the lens unit 10 is fixed. In this manner, in the state where the position of the lens unit 10 is fixed, the Z-axis coincides with the optical axis Ax of the lens group 12.

Referring back to FIG. 13, the lens-unit holding portion 77 includes a first slide stage 99, movable in the Z direction, and a probe unit 113 and a holding plate 114, disposed on a stage portion 99a of the first slide stage 99.

The first slide stage 99 is an electric precision stage. The first slide stage 99 rotates a ball screw using a rotation of a motor, not illustrated, to move the stage portion 99a, engaged with the ball screw, in the Z direction. The first slide stage 99 is controlled by the control unit 85.

The holding plate 114 has a configuration that holds the lens unit 10 such that the upper surface 11a of the housing 11 faces the measurement-chart installation portion 71 on the Z-axis. The lens unit 10 is held by the imaging-module manufacturing device 200 as a result of moving the stage portion 99a in the Z direction and pressing the holding plate 114 against the lens unit 10 whose position is fixed by the lens positioning plate 75.

The probe unit 113 includes multiple probes 113a (only one probe is illustrated in FIG. 13). In the state where the first slide stage 99 is moved in the Z direction and the holding plate 114 is pressed against the lens unit 10, contactors of the probes 113a come into contact with the terminals 14A to 14F of the lens unit 10.

The probe unit 113 passes a current to the terminals 14A to 14F through the probes 113a to drive the X-direction VCM 50A, the Y-direction VCM 50C, and the Z-direction VCM 60E.

Each probe 113a included in the probe unit 113 is a so-called spring probe and includes a contactor that comes into contact with a contact-target portion, a connector that is electrically connected to a circuit board in the probe unit 113, and an elastic body, such as a spring, that is disposed between the contactor and the connector and urges the contactor. The contactor of each probe 113a is made of, for example, a nonmagnetic material. The circuit board in the probe unit 113 is electrically connected to a lens driver 145, described below.

The imaging-device-unit holding portion 79 has a configuration that holds the imaging device unit 20 on the Z-axis. The imaging-device-unit holding portion 79 is capable of changing the position of the imaging device unit 20 in the Z direction and the tilt of the imaging device unit 20 under the control of the control unit 85. Here, the tilt of the imaging device unit 20 represents the tilt of the imaging surface 27a of the imaging device 27 with respect to a flat plane perpendicular to the Z-axis.

The imaging-device-unit holding portion 79 includes a chuck hand 115, which holds the imaging device unit 20 such that the imaging surface 27a faces the measurement-chart installation portion 71 on the Z-axis, a biaxial rotation stage 119, which holds a substantially crank-shaped bracket 117 to which the chuck hand 115 is attached and adjusts the tilt around two axes (X-axis and Y-axis) perpendicular to the Z-axis, and a second slide stage 123, which holds a bracket 121 to which the biaxial rotation stage 119 is attached and moves the bracket 121 in the Z direction.

As illustrated in FIG. 15, the chuck hand 115 includes a pair of clamping members 115a, bent so as to have a substantially crank shape, and an actuator 115b (see FIG. 13), which moves these clamping members 115a in the X direction perpendicular to the Z-axis. The clamping members 115a hold an outer frame of the imaging device unit 20 therebetween to hold the imaging device unit 20.

Referring back to FIG. 13, the chuck hand 115 fixes the position of the imaging device unit 20 held between the clamping members 115a such that the optical axis Ax of the lens unit 10 held by the lens positioning plate 75 and the lens-unit holding portion 77 and the center position of the imaging surface 27a coincide with each other.

The chuck hand 115 fixes the position of the imaging device unit 20 held between the clamping members 115a such that each terminal of the imaging-device-unit terminal unit 24 of the imaging device unit 20 overlaps the corresponding terminal of the lens-unit terminal unit 14 of the held lens unit 10 when viewed in the Z direction.

The biaxial rotation stage 119 is an electric biaxial gonioscopic stage. The biaxial rotation stage 119 tilts the imaging device unit 20 in a θX direction around the X-axis and a θY direction around the Y-axis (see FIG. 15), perpendicular to the Z-axis and the X-axis, using rotations of two motors, not illustrated, while the center position of the imaging surface 27a is used as a rotation center. Thus, when the imaging device unit 20 is tilted in each direction, the positional relationship between the center position of the imaging surface 27a and the Z-axis is prevented from being changed.

The second slide stage 123 is an electric precision stage. The second slide stage 123 rotates a ball screw using a rotation of a motor, not illustrated, to move a stage portion 123a engaged with the ball screw in the Z direction. The bracket 121 is fixed to the stage portion 123a.

A connector cable 127 connected to the external connection terminal unit 23 disposed at the tip of the flexible board 22 of the imaging device unit 20 is attached to the biaxial rotation stage 119. This connector cable 127 inputs driving signals of the imaging device 27 or outputs image-capturing image signals output from the imaging device 27.

The adhesive supplying portion 81 and the ultraviolet lamp 83 form a unit-fixing portion of the present invention that fixes the lens unit 10 and the imaging device unit 20 together.

The adhesive supplying portion 81 supplies an adhesive 18, which cures with light (here, for example, an ultraviolet cure adhesive), to a gap between the lens unit 10 and the imaging device unit 20 after the position and the tilt of the imaging device unit 20 relative to the lens unit 10 are adjusted.

The ultraviolet lamp 83 cures the adhesive by illuminating the ultraviolet curable adhesive 18 supplied to the gap with ultraviolet rays. Besides the ultraviolet cure adhesive, other adhesives such as an instant adhesive, a thermosetting adhesive, or an air-setting adhesive are also usable as the adhesive 18.

Figure 16:
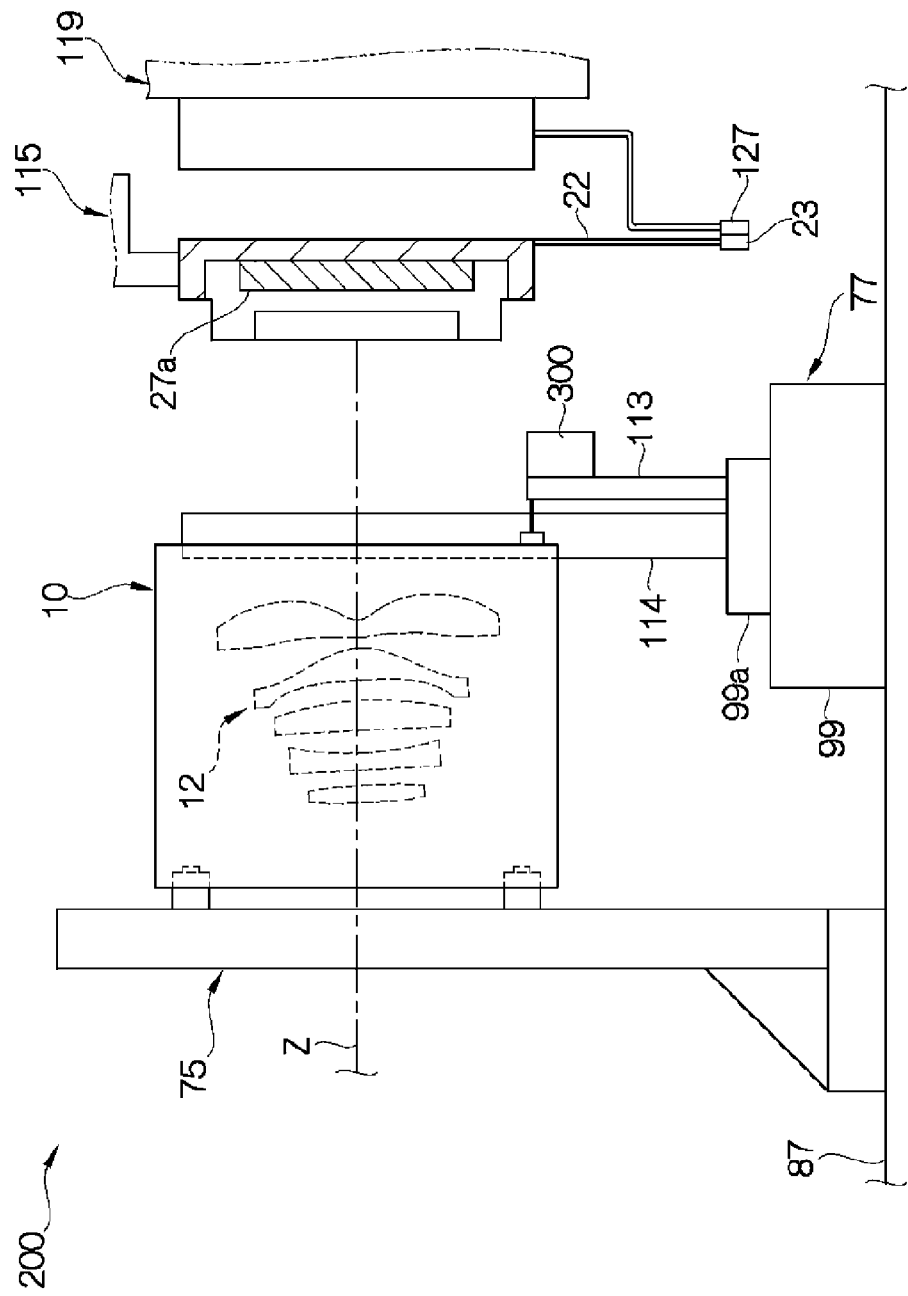
FIG. 16 is an enlarged view of a portion of the imaging-module manufacturing device according to the second embodiment and illustrates the state where the magnetic-field generating unit is attached to the inside of the imaging-module manufacturing device.

FIG. 16 is an enlarged diagram of a portion of the imaging-module manufacturing device 200 illustrated in FIG. 13. The magnetic-field generating unit 300 included in the electronic device 301 to which the imaging module 100 is installed is detachably attached to the imaging-module manufacturing device 200. In this embodiment, for example, the magnetic-field generating unit 300 is attached to a portion on the stage portion 99a that moves integrally with the lens unit 10. The positional relationship between the lens unit 10 and the magnetic-field generating unit 300 in the imaging-module manufacturing device 200 is adjusted so as to be the same (including the case of substantially the same) as the positional relationship between the lens unit 10 and the magnetic-field generating unit 300 in the case where the imaging module 100 is installed in the electronic device 301. In other words, a magnetic field having a magnitude equal to the magnitude of the magnetic field applied from the magnetic-field generating unit 300 to the lens unit 10 in the actual operation conditions installed in the electronic device 301 is applied to the lens unit 10 in the imaging-module manufacturing device 200.

Instead of the magnetic-field generating unit 300 installed in the electronic device 301, a magnetic-field generating unit such as an electromagnet that can apply a magnetic field having a magnitude equal to the magnitude of the magnetic field applied from the magnetic-field generating unit 300 may be disposed. The term "equal" here means that the intensity of the magnetic field applied from the electromagnet or the like, if the intensity can be set stepwise, is within the range set stepwise. For example, when the intensity of the magnetic field can be input up to the first decimal place at the time of setting, the intensity is regarded as being equal if the intensity up to that number of digits is the same.

<Electrical Configuration of Imaging-Module Manufacturing Device According to Second Embodiment>

Figure 17:
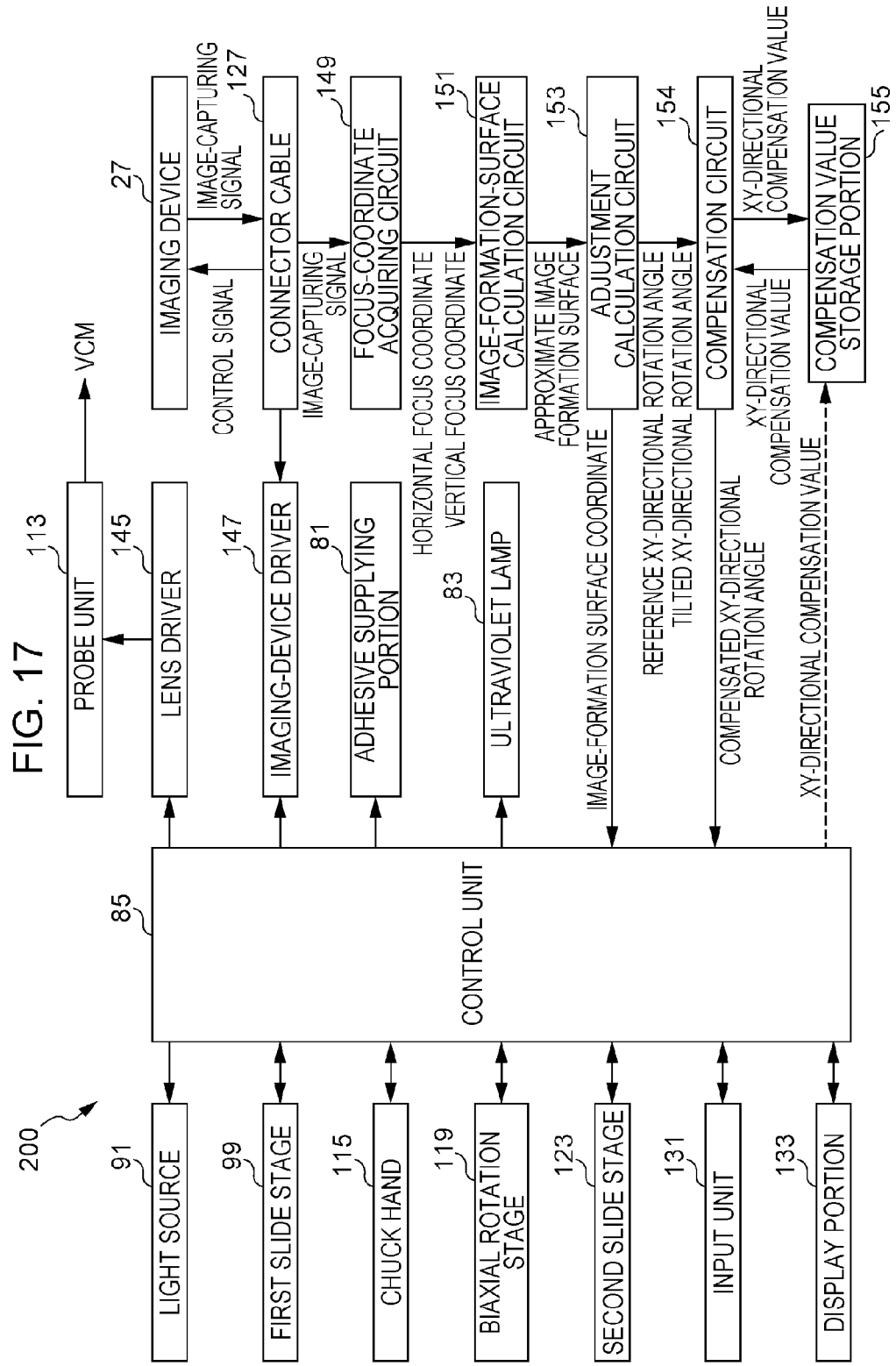
FIG. 17 is a block diagram of an electrical configuration of the imaging-module manufacturing device according to the second embodiment.

FIG. 17 is a block diagram of an electrical configuration of the imaging-module manufacturing device 200.

A control unit 85 is a microcomputer including, for example, a CPU, a ROM, and a RAM. The control unit 85 controls each component on the basis of a control program stored in the ROM. An input unit 131, such as a keyboard and a mouse through which various settings are made, and a display portion 133, which displays setting details, operation details, operation results, and the like, are also connected to the control unit 85.

The lens driver 145 is a driving circuit for driving the X-direction VCM 50A, the Y-direction VCM 50C, and the Z-direction VCM 60E. The lens driver 145 supplies driving currents to the X-direction VCM 50A, the Y-direction VCM 50C, and the Z-direction VCM 60E through the probe unit 113.

An imaging-device driver 147 is a driving circuit for driving the imaging device 27 and inputs driving signals to the imaging device 27 through the connector cable 127.

Although described in detail below, a focus-coordinate acquiring circuit 149 acquires focus coordinates, which are positions at which the degree of focus in the Z direction is high, for multiple imaging positions (positions corresponding to the chart images CH1, CH2, CH3, CH4, and CH5 of the measurement chart 89) set on the imaging surface 27a of the imaging device 27.

When the control unit 85 acquires focus coordinates for multiple imaging positions, the control unit 85 controls the second slide stage 123 and sequentially moves the imaging device unit 20 to multiple measurement positions (Z0, Z1, Z2, . . . ) discretely determined in advance on the Z-axis. Thus, the relative position of the measurement-chart installation portion 71, the lens-unit holding portion 77, and the imaging-device-unit holding portion 79 on the shaft 87 (Z-axis) is changed.

The control unit 85 controls the imaging-device driver 147 and causes the imaging device 27 to capture multiple chart images CH1, CH2, CH3, CH4, and CH5 of the measurement chart 89, imaged by the lens group 12 at the respective measurement positions (Z0, Z1, Z2, . . . ). In other words, the control unit 85, the second slide stage 123, and the imaging-device driver 147 constitute a chart imaging control unit of the present invention.

Such a movement of the imaging device unit 20 to each measurement position performed by the control unit 85 and image capturing for each measurement position performed by the imaging device 27 are performed also in the state where the magnetic-field generating unit 300 is set in the imaging-module manufacturing device 200 besides the state where the magnetic-field generating unit 300 is not set in the imaging-module manufacturing device 200.

The focus-coordinate acquiring circuit 149 picks up pixel signals corresponding to the multiple imaging positions from the image-capturing signals input through the connector cable 127 and calculates individual focus evaluation values on the multiple imaging positions from the pixel signals. The measurement position at which a predetermined focus evaluation value is obtained for each imaging position is determined as a focus coordinate on the Z-axis. Here, focus coordinates acquired in the state where the magnetic-field generating unit 300 is not set in the imaging-module manufacturing device 200 correspond to first focus information of the present invention and focus coordinates acquired in the state where the magnetic-field generating unit 300 is set in the imaging-module manufacturing device 200 correspond to second focus information of the present invention. The focus-coordinate acquiring circuit 149 corresponds to a focus-information acquiring portion of the present invention.

A value expressing the resolution of the lens group 12, for example, a contrast transfer function value (contrast transfer function: hereinafter abbreviated to a CTF value) may be used as a focus evaluation value. A CTF value is a value representing the contrast of an image in relation to the spatial frequency. When the CTF value is high, the degree of focus is regarded as being high.

The focus-coordinate acquiring circuit 149 calculates CTF values in multiple directions set on the XY planes of coordinates at each of multiple measurement positions (Z0, Z1, Z2, . . . ) set on the Z-axis at each of the multiple imaging positions.

The directions for which a CTF value is calculated are, for example, a horizontal direction (X direction), which is a lateral direction of the imaging surface 27a, and a vertical direction (Y direction), perpendicular to the horizontal direction. An X-CTF value and a Y-CTF value, which are CTF values of the respective directions, are calculated.

The focus-coordinate acquiring circuit 149 acquires coordinates on the Z-axis (Zp1, Zp2, Zp3, Zp4, and Zp5) at measurement positions at which the X-CTF value is maximum for multiple imaging positions corresponding to the chart images CH1, CH2, CH3, CH4, and CH5 as horizontal focus coordinates (first focus information and second focus information). Similarly, the focus-coordinate acquiring circuit 149 acquires coordinates on the Z-axis at measurement positions at which the Y-CTF value is maximum as vertical focus coordinates (first focus information and second focus information).

Horizontal focus coordinates and vertical focus coordinates at the imaging positions are input to an image-formation-surface calculation circuit 151 from the focus-coordinate acquiring circuit 149.

The image-formation-surface calculation circuit 151 develops, in a three dimensional coordinate system in which the XY planes of coordinates and the Z-axis are combined, the XY coordinates at each imaging position obtained when the imaging surface 27a is caused to correspond to the XY planes of coordinates and multiple evaluation points expressed by a combination of the horizontal focus coordinate and the vertical focus coordinate on the Z-axis obtained for each imaging position. The image-formation-surface calculation circuit 151 calculates, on the basis of the relative position of these evaluation points, an approximate image formation surface expressed as one flat plane in the three dimensional coordinate system. This approximate image formation surface represents a second reference position of the present invention. Thus, the image-formation-surface calculation circuit 151 corresponds to a reference position calculation portion of the present invention.

Information of the approximate image formation surface is input from the image-formation-surface calculation circuit 151 to an adjustment calculation circuit 153. The adjustment calculation circuit 153 calculates image-formation surface coordinates on the Z-axis, which are a point of intersection of the approximate image formation surface and the Z-axis, and a XY-directional rotation angle (reference XY-directional rotation angle or tilted XY-directional rotation angle), which is a tilt of the approximate image formation surface around the X-axis and the Y-axis with respect to the XY planes of coordinates. The adjustment calculation circuit 153 outputs the image-formation surface coordinates to the control unit 85 and outputs the XY-directional rotation angle to a compensation circuit 154.

Here, in the state where the magnetic-field generating unit 300 is not set in the imaging-module manufacturing device 200, that is, where a magnetic field is not applied to the lens unit 10 from the magnetic-field generating unit 300, the adjustment calculation circuit 153 outputs the "reference XY-directional rotation angle" to the compensation circuit 154 as an XY-directional rotation angle. In the state, on the other hand, where the magnetic-field generating unit 300 is set in the imaging-module manufacturing device 200, that is, where a magnetic field is applied to the lens unit 10 from the magnetic-field generating unit 300, the adjustment calculation circuit 153 outputs the "tilted XY-directional rotation angle" to the compensation circuit 154 as the XY-directional rotation angle.

Figure 18:
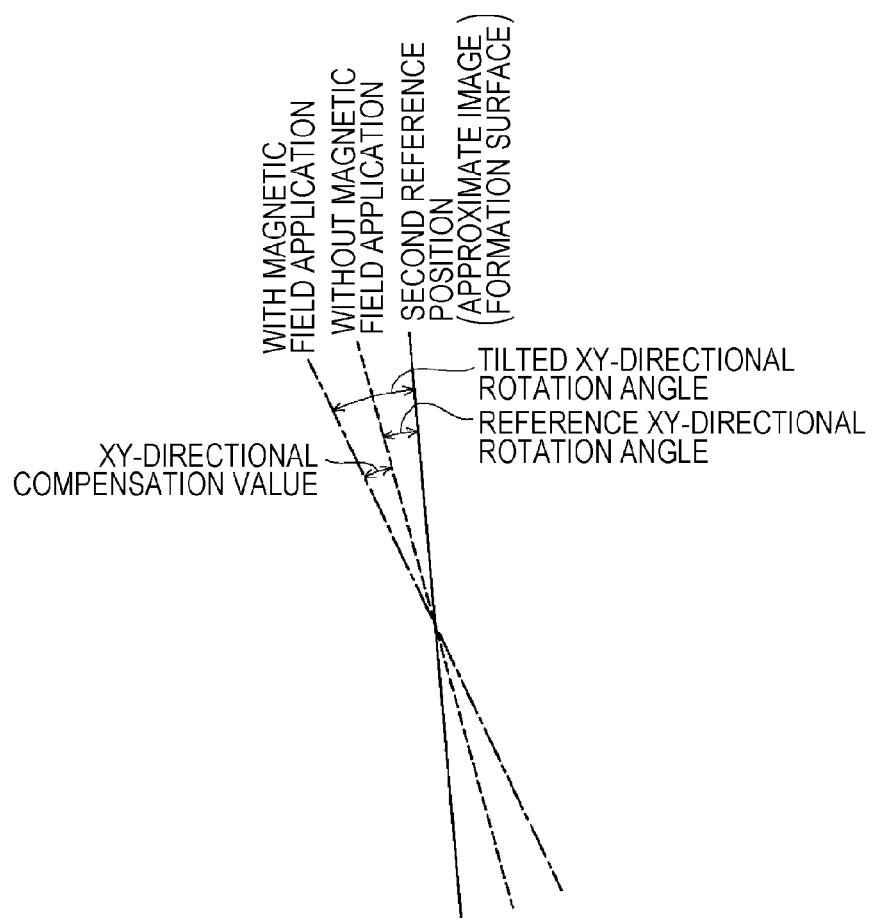
FIG. 18 is an illustration illustrating the relationship between a second reference position, a reference XY-directional rotation angle, a tilted XY-directional rotation angle, and an XY-directional compensation value.

As illustrated in FIG. 18, in the state where a magnetic field is not applied to the lens unit 10 from the magnetic-field generating unit 300, the reference XY-directional rotation angle represents the direction of tilt and the amount of tilt used for adjusting the tilt of the lens group 12 relative to the imaging device 27 to match the approximate image formation surface (second reference position). On the other hand, the tilted XY-directional rotation angle represents the direction of tilt and the amount of tilt used for adjusting the tilt of the lens group 12 relative to the imaging device 27 to match the approximate image formation surface (second reference position) in a tilt position in which the lens group 12 is tilted as a result of an application of a magnetic field from the magnetic-field generating unit 300 to the lens unit 10. This tilted XY-directional rotation angle corresponds to a tilt position of the present invention.

Here, in the case where the tilt of the lens group 12 is adjusted in accordance with the reference XY-directional rotation angle, when the imaging module 100 is installed in the electronic device 301, the lens group 12 is tilted from the second reference position due to the magnetic field being applied from the magnetic-field generating unit 300 to the lens unit 10. Thus, as in the case of the first embodiment, the direction of tilt in which and the amount of tilt by which the lens group 12 (movable image-stabilizing unit 30) is tilted as a result of an application of the magnetic field from the magnetic-field generating unit 300 are acquired in advance, and the lens group 12 is tilted by this amount of tilt in a direction opposite to the direction of tilt. In other words, when the imaging module 100 is installed in the electronic device 301, the tilt of the lens group 12 is adjusted so that the lens group 12 matches the second reference position.

The direction of tilt in which and the amount of tilt by which the lens group 12 (movable image-stabilizing unit 30) is tilted as a result of an application of the magnetic field are calculated as a XY-directional compensation value by comparing the reference XY-directional rotation angle and the tilted XY-directional rotation angle to each other. The XY-directional compensation value corresponds to "an amount of tilt and a direction of tilt of the movable image-stabilizing unit" and "a compensation angle and a compensation direction" of the present invention.

Referring back to FIG. 17, the compensation circuit 154 calculates the XY-directional compensation value on the basis of the results obtained after comparing the reference XY-directional rotation angle and the tilted XY-directional rotation angle input from the adjustment calculation circuit 153 and stores the XY-directional compensation value in a compensation value storage portion 155. Here, the imaging modules 100 of the same model installed in the electronic devices 301 of the same type yield basically the same XY-directional compensation value. Thus, calculation of the XY-directional compensation value is only required for each combination of the electronic device 301 of a specific model and the imaging module 100 of a specific model. Thus, in the case where the XY-directional compensation value for a specific combination have been stored in the compensation value storage portion 155, the above-described measurement of the tilted XY-directional rotation angle and calculation of the XY-directional compensation value may be omitted.

The compensation circuit 154 calculates a compensated XY-directional rotation angle obtained by compensating the reference XY-directional rotation angle input from the adjustment calculation circuit 153 with the XY-directional compensation value read from the compensation value storage portion 155 and then outputs the compensated XY-directional rotation angle to the control unit 85.

The control unit 85 drives the biaxial rotation stage 119 and the second slide stage 123 of the imaging-device-unit holding portion 79 on the basis of the image-formation surface coordinates input from the adjustment calculation circuit 153 and the compensated XY-directional rotation angle input from the compensation circuit 154 and adjusts the position of the imaging device unit 20 in the Z direction and the tilt of the imaging device unit 20. In other words, the control unit 85 and the biaxial rotation stage 119 function as an adjustment portion of the present invention.

Figure 19:
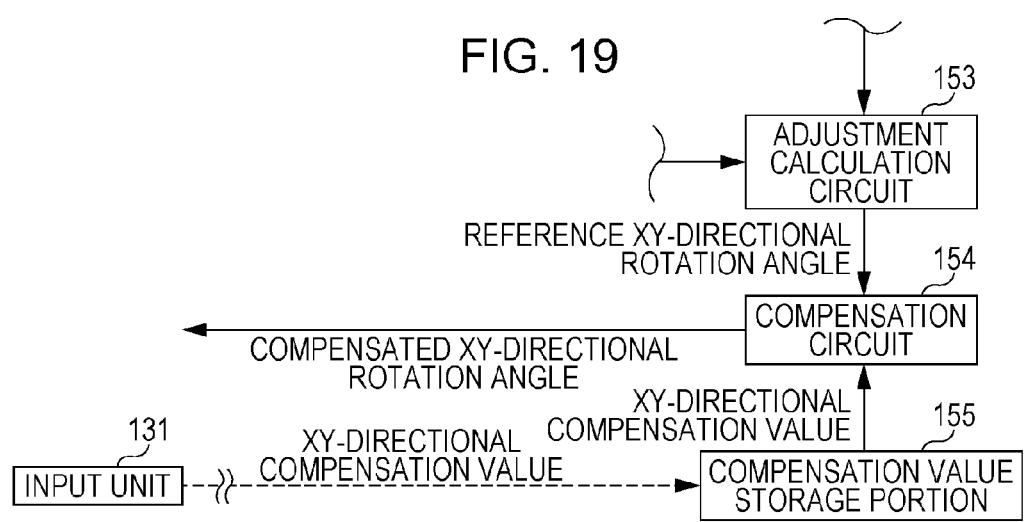
FIG. 19 is an illustration illustrating an input of an XY-directional compensation value from an input unit.

As illustrated in FIG. 19, in the case where the XY-directional compensation value for a combination of the electronic device 301 of a specific model and the imaging module 100 of a specific model (hereinafter, simply abbreviated to XY-directional compensation value) is known, the XY-directional compensation value may be input from the input unit 131 and stored in the compensation value storage portion 155 instead of measuring the tilted XY-directional rotation angle and calculating the XY-directional compensation value. Thus, the compensated XY-directional rotation angle is calculated on the basis of the XY-directional compensation value input from the input unit 131 and the reference XY-directional rotation angle input from the adjustment calculation circuit 153, so that measurement of the tilted XY-directional rotation angle and calculation of the XY-directional compensation value can be dispensed with. The XY-directional compensation value may be input to a communication interface connected to, for example, Internet while the communication interface is used as an input unit of the present invention.

<Process Flow of Manufacturing Imaging Module According to Second Embodiment>

Figure 20:
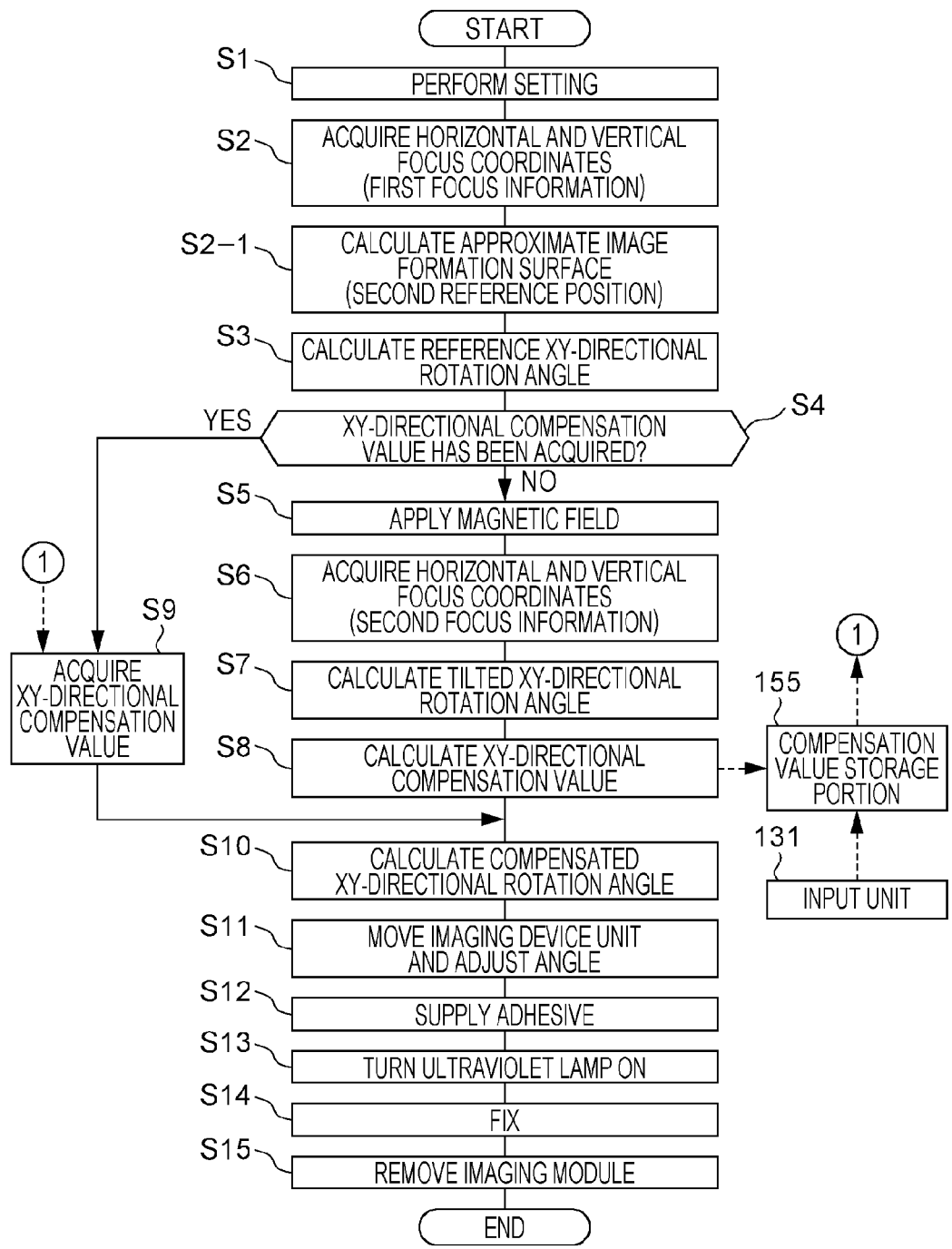
FIG. 20 is a flowchart illustrating a imaging-module manufacturing flow performed by the imaging-module manufacturing device according to the second embodiment, particularly, a flow of fixing the lens unit and the imaging device unit to each other.

Using the flowchart illustrated in FIG. 20, manufacturing of the imaging module 100 using the imaging-module manufacturing device 200 having the above-described configuration, particularly, a process of fixing the lens unit 10 and the imaging device unit 20 together is described now.

Firstly, an operation of setting the lens unit 10 and the imaging device unit 20 is described (step S1).

The control unit 85 forms a space into which the lens unit 10 is insertable between the lens positioning plate 75 and the holding plate 114 by controlling the first slide stage 99 so that the holding plate 114 is moved in the Z direction. The lens unit 10 is held by a robot, not illustrated, and transported to the space between the lens positioning plate 75 and the holding plate 114.

The control unit 85 detects a movement of the lens unit 10 using an optical sensor or the like and moves the stage portion 99a of the first slide stage 99 toward the lens positioning plate 75. The recessed portions 95A, 95B, and 95C of the lens unit 10 come into contact with the contact pins 93A, 93B, and 93C and the insertion pins 93A1 and 93C1 are inserted into the recessed portions 95C1 and 95A1. Thus, the position of the lens unit 10 is fixed in the Z direction, the X direction, and the Y direction. When the stage portion 99a is moved further toward the lens positioning plate 75, the lens unit 10 is interposed between the holding plate 114 and the lens positioning plate 75, so that the lens unit 10 is set to the lens-unit holding portion 77.

In the state where the lens unit 10 is being held, the contactors of the probes 113a of the probe unit 113 are brought into contact with the terminals 14A to 14F of the lens unit 10, so that the X-direction VCM 50A, the Y-direction VCM 50C, and the Z-direction VCM 60E are electrically connected to the lens driver 145.

Subsequently, the control unit 85 forms a space into which the imaging device unit 20 is insertable between the lens-unit holding portion 77 and the biaxial rotation stage 119 by controlling the second slide stage 123 so that the biaxial rotation stage 119 is moved in the Z direction. The imaging device unit 20 is held by a robot, not illustrated, and transported to the space between the lens-unit holding portion 77 and the biaxial rotation stage 119.

The control unit 85 detects a movement of the imaging device unit 20 using an optical sensor or the like and moves the stage portion 123a of the second slide stage 123 toward the holding plate 114. Then, an operator sets the imaging device unit 20 at the imaging-device-unit holding portion 79 using the clamping members 115a of the chuck hand 115. The operator also connects the connector cable 127 to the external connection terminal unit 23 of the imaging device unit 20. Thus, the imaging device 27 and the control unit 85 become electrically connected together. Thereafter, the robot, not illustrated, is caused to let go of the imaging device unit 20. Thus, the operation of setting the lens unit 10 and the imaging device unit 20 is complete (step S1).

Subsequently, in the state where the magnetic-field generating unit 300 is not set in the imaging-module manufacturing device 200, the horizontal focus coordinate and the vertical focus coordinate at each of the imaging positions of the imaging surface 27a corresponding to the chart images CH1, CH2, CH3, CH4, and CH5 start being acquired (step S2).

The control unit 85 controls the second slide stage 123 so that the biaxial rotation stage 119 is moved toward the holding plate 114 and moves the imaging device unit 20 to an initial measurement position at which the imaging device 27 is positioned closest to the lens unit 10.

After the movement of the imaging device unit 20, the control unit 85 causes the light source 91 of the measurement-chart installation portion 71 to emit light. The control unit 85 causes the lens driver 145 to input driving signals to the terminals 14A to 14F to drive the X-direction VCM 50A, the Y-direction VCM 50C, and the Z-direction VCM 60E, so that the position of the optical axis Ax of the lens group 12 in the X direction, the Y direction, and the Z direction is held at a reference position (for example, initial position during actual use).

Subsequently, the control unit 85 controls the imaging-device driver 147 so that the imaging device 27 is caused to capture chart images CH1, CH2, CH3, CH4, and CH5 imaged by the lens unit 10. The imaging device 27 inputs the captured image-capturing signals into the focus-coordinate acquiring circuit 149 through the connector cable 127.

The focus-coordinate acquiring circuit 149 extracts pixel signals at the imaging positions corresponding to the chart images CH1, CH2, CH3, CH4, and CH5 from the input image-capturing signals and calculates the X-CTF value and Y-CTF value for each imaging position from the pixel signals. The control unit 85 stores information of the X-CTF value and the Y-CTF value in, for example, a RAM in the control unit 85.

The control unit 85 sequentially moves the imaging device unit 20 to multiple measurement positions (Z0, Z1, Z2, . . . ) set in the Z direction. At each measurement position, the control unit 85 causes the imaging device 27 to capture a chart image of the measurement chart 89 while the position of the optical axis Ax of the lens group 12 in the X direction, the Y direction, and the Z direction is maintained at a reference position. The focus-coordinate acquiring circuit 149 calculates the X-CTF values and the Y-CTF values at the imaging positions at each measurement position.

The focus-coordinate acquiring circuit 149 selects the maximum value at each imaging position from among the multiple X-CTF values and Y-CTF values thus calculated and acquires the Z-axis coordinate of the measurement position at which the maximum value is obtained as the horizontal focus coordinate and the vertical focus coordinate of the imaging position. Thus, acquirement of the horizontal focus coordinate and the vertical focus coordinate (first focus information) is complete (step S2, or focus information acquiring step).

The horizontal focus coordinate and the vertical focus coordinate acquired by the focus-coordinate acquiring circuit 149 are input to the image-formation-surface calculation circuit 151. The image-formation-surface calculation circuit 151 calculates an approximate image formation surface (second reference position) obtained through two-dimensional approximation by, for example, the method of least squares (step S2-1 or reference position calculation step).

Information of the approximate image formation surface calculated by the image-formation-surface calculation circuit 151 is input to the adjustment calculation circuit 153. The adjustment calculation circuit 153 calculates image-formation surface coordinates, which are a point of intersection of the approximate image formation surface and the Z-axis, and the reference XY-directional rotation angle, which is a tilt of the approximate image formation surface around the X-axis and the Y-axis with respect to the XY planes of coordinates (step S3). The adjustment calculation circuit 153 then outputs the image-formation surface coordinates to the control unit 85 and outputs the reference XY-directional rotation angle to the compensation circuit 154.

In the case where the XY-directional compensation value has neither been input in advance from the input unit 131 nor been calculated by the compensation circuit 154, in other words, the XY-directional compensation value has not been stored in the compensation value storage portion 155, the horizontal focus coordinate and the vertical focus coordinate at each imaging position of the imaging surface 27a start being acquired in the state where the magnetic-field generating unit 300 is set in the imaging-module manufacturing device 200 (NO in step S4).

Firstly, the magnetic-field generating unit 300 is attached to the inside of the imaging-module manufacturing device 200. Thus, a magnetic field having a magnitude equal to the magnitude of the magnetic field applied from the magnetic-field generating unit 300 in the state where the lens unit 10 is installed in the electronic device 301 is applied to the lens unit 10 in the imaging-module manufacturing device 200 (step S5). Consequently, the movable image-stabilizing unit 30 including the lens group 12 is tilted by an effect of the magnetic field applied from the magnetic-field generating unit 300.

Subsequently, as in the case of the above-described calculation of the reference XY-directional rotation angle, the control unit 85 causes the imaging device 27 to capture a chart image of the measurement chart 89 at each measurement position by controlling the lens driver 145 and the imaging-device driver 147 so that the imaging device unit 20 is sequentially moved to multiple measurement positions (Z0, Z1, Z2, . . . ) set in the Z direction.

The focus-coordinate acquiring circuit 149 calculates the X-CTF values and the Y-CTF values at the respective imaging positions at each measurement position. The focus-coordinate acquiring circuit 149 then selects the maximum value at each of the imaging positions from among the multiple X-CTF values and Y-CTF values thus calculated and acquires the Z-axis coordinate at the measurement position at which the maximum value is obtained as the horizontal focus coordinate and the vertical focus coordinate at the imaging position. Thus, acquirement of the horizontal focus coordinate and the vertical focus coordinate (second focus information) is complete (step S6).

The horizontal focus coordinate and the vertical focus coordinate acquired by the focus-coordinate acquiring circuit 149 are input to the image-formation-surface calculation circuit 151 and the image-formation-surface calculation circuit 151 calculates the approximate image formation surface. The adjustment calculation circuit 153 then calculates the tilted XY-directional rotation angle, which is a tilt of the approximate image formation surface around the X-axis and the Y-axis with respect to the XY planes of coordinates, and inputs the tilted XY-directional rotation angle to the compensation circuit 154 (step S7).

The compensation circuit 154 calculates the XY-directional compensation value on the basis of the results obtained by comparing the reference XY-directional rotation angle and the tilted XY-directional rotation angle input from the adjustment calculation circuit 153 and then stores the XY-directional compensation value in the compensation value storage portion 155 (step S8).

On the other hand, in the case where the XY-directional compensation value input from the input unit 131 or the XY-directional compensation value calculated by the compensation circuit 154 have been stored in the compensation value storage portion 155, the compensation circuit 154 acquires the XY-directional compensation value from the compensation value storage portion 155 (YES in step S4 and step S9).

The compensation circuit 154 calculates the compensated XY-directional rotation angle on the basis of the XY-directional compensation value by compensating the reference XY-directional rotation angle input from the adjustment calculation circuit 153 with the XY-directional compensation value and outputs the compensated XY-directional rotation angle to the control unit 85 (step S10).

The control unit 85 controls the biaxial rotation stage 119 and the second slide stage 123 on the basis of the image-formation surface coordinates and the compensated XY-directional rotation angle and moves the imaging device unit 20 in the Z direction so that the center position of the imaging surface 27a of the imaging device 27 coincides with the image-formation surface coordinates. The control unit 85 adjusts angles in the θX direction and the θY direction of the imaging device unit 20 on the basis of the compensated XY-directional rotation angle (step S11). The lens group 12 is thus tilted from the above-described second reference position relative to the imaging device 27 by an amount of tilt by which the lens group 12 is tilted due to the effect of the magnetic field of the magnetic-field generating unit 300 in a direction opposite to the direction of tilt in which the lens group 12 is tilted due to the effect of the magnetic field.

The control unit 85 supplies the adhesive 18 to a gap between the lens unit 10 and the imaging device unit 20 from the adhesive supplying portion 81 (step S12). The control unit 85 then turns the ultraviolet lamp 83 on after the movement and tilt adjustment of the imaging device unit 20 (step S13). Thus, the adhesive 18 cures and the lens unit 10 and the imaging device unit 20 are fixed together (step S14 or fixing step).

After the lens unit 10 and the imaging device unit 20 are fixed together, the control unit 85 moves the stage portion 99a toward the imaging-device-unit holding portion 79 to detach the contactors of the probes 113a and the terminals 14A to 14F of the lens unit 10 from one another. Thereafter, the complete imaging module 100 is removed from the imaging-module manufacturing device 200 by a robot, not illustrated (step S15).

Although the lens unit 10 and the imaging device unit 20 can be fixed using the ultraviolet curable adhesive 18, curing using the adhesive 18 may be used as temporary fixing of the lens unit 10 and the imaging device unit 20 together. For example, in the state where the lens unit 10 and the imaging device unit 20 are temporarily fixed together, the imaging module 100 may be removed from the imaging-module manufacturing device 200. After an intended process such as a cleaning process is performed, the lens unit 10 and the imaging device unit 20 may be permanently fixed by a thermosetting adhesive or the like.

<Effect of Second Embodiment>

As described above, in the imaging module 100 manufactured by the imaging-module manufacturing device 200, the lens unit 10 and the imaging device unit 20 are fixed together in the state where the lens group 12 has been tilted from the above-described second reference position on the basis of the XY-directional compensation value. Thus, when the imaging module 100 is installed in the electronic device 301, the lens group 12 is adjusted to be in the second reference position as a result of the movable image-stabilizing unit 30 being tilted by the magnetic field applied from the magnetic-field generating unit 300 to the lens unit 10. Consequently, the lens group 12 can be prevented from being tilted from the second reference position even when the imaging module 100 is disposed near the magnetic-field generating unit 300 in the electronic device 301. Effects the same as those described in the first embodiment can be obtained.

<Other Examples of Second Embodiment>

In steps S2 and S6 in FIG. 20, the focus coordinates may be acquired at each measurement position by changing the measurement position as a result of rendering the lens positioning plate 75 and the lens-unit holding portion 77 movable in the Z direction and moving the lens-unit holding portion 77 or other components in the Z direction while the imaging-device-unit holding portion 79 is left at a fixed position in the Z direction or as a result of moving the lens-unit holding portion 77 or other components and the imaging-device-unit holding portion 79 in the Z direction.

Alternatively, the focus coordinates may be acquired by changing the measurement position as a result of moving the measurement-chart installation portion 71 in the Z direction while the lens-unit holding portion 77 or other components and the imaging-device-unit holding portion 79 are left at fixed positions in the Z direction. Alternatively, the focus coordinates may be acquired by changing the measurement position as a result of changing the positions of the lens-unit holding portion 77 or other components, the imaging-device-unit holding portion 79, and the measurement-chart installation portion 71 in the Z direction. In other words, any configuration will suffice as long as the focus coordinates are acquired by the imaging device 27 capturing images of the measurement chart 89 at each relative position of the lens unit 10, the imaging device unit 20, and the measurement chart 89 in the Z direction after the relative position is changed to change the measurement position.

The second embodiment describes the case where multiple measurement positions are set by changing the relative position and images of the measurement chart are captured when the measurement positions are set. Instead, images of the measurement chart may be continuously captured (that is, moving images are captured) and the relative position may be changed so as to set the measurement positions during capturing of the moving images.

In step S11 of FIG. 20, described above, the position of the imaging device unit 20 in the Z direction relative to the lens unit 10 is adjusted by moving the imaging device unit 20 while the position of the lens unit 10 in the Z direction is left at a fixed position. As a modified example, the positions may be adjusted by rendering the lens-unit holding portion 77 or other components movable in the Z direction and moving the lens-unit holding portion 77 or other components while the imaging-device-unit holding portion 79 is left at a fixed position or by moving the lens-unit holding portion 77 or other components and the imaging-device-unit holding portion 79. Alternatively, the tilt of the lens unit 10 may be adjusted using the lens-unit holding portion 77 or other components while the imaging-device-unit holding portion 79 is left at a fixed position.

In step S11 of FIG. 20, the position of the imaging device unit 20 in the Z direction and the tilt of the imaging device unit 20 relative to the lens unit 10 are adjusted. However, the adjustment of the position in the Z direction may be omitted. In a configuration, for example, where the lens barrel 15 in the lens unit 10 is rendered slidable in the direction of the optical axis Ax using a screw structure or the like, the adjustment of the position in the Z direction may be omitted.

In the imaging-module manufacturing device 200, the imaging device 27 and the imaging-device driver 147 are electrically connected together using the external connection terminal unit 23 of the imaging device unit 20. However, the electric connection method may be changed as appropriate to, for example, a method with which multiple probes that come into contact with the back surface of the imaging device 27 are disposed on the biaxial rotation stage 119 so that the imaging device 27 and the imaging-device driver 147 are electrically connected together.

In the imaging-module manufacturing device 200, the recessed portions 95A, 95B, and 95C of the lens unit 10 are brought into contact with the contact pins 93A, 93B, and 93C of the lens positioning plate 75 and the lens unit 10 is pressed against the lens positioning plate 75 by the holding plate 114, so that the lens unit 10 is held on the Z-axis. However, the lens unit 10 may be held on the Z-axis using, for example, various types of jigs.

In the second embodiment, the horizontal focus coordinate and the vertical focus coordinate (second focus information) are acquired by the imaging-module manufacturing device 200. However, the second focus information may be acquired by the electronic device 301 (that is, in actual operation conditions) in which the imaging module 100 is installed. For example, in the state where the measurement chart 89 is set in front of the imaging module 100 of the electronic device 301, the imaging device 27 is caused to capture chart images of the measurement chart 89 at each measurement position while the focus adjusting mechanism 60 is driven so as to sequentially move the movable image-stabilizing unit 30 to multiple measurement positions (Z0, Z1, Z2, . . . ) set in the Z direction. Thus, as in the case of the imaging-module manufacturing device 200, the horizontal focus coordinate and the vertical focus coordinate (second focus information) can be acquired.

In the second embodiment, in order to adjust the tilt of the imaging device unit 20 using the biaxial rotation stage 119, the XY-directional rotation angle is calculated by the adjustment calculation circuit 153. However, the compensation value is not particularly limited to the XY-directional rotation angle as long as the compensation value represents the direction of tilt and the amount of tilt for tilt adjustment. Alternatively, tilt adjustment may be performed by using a device other than the biaxial rotation stage.

[Imaging-Module Manufacturing Method and Manufacturing Device According to Third Embodiment]

Figure 22A:
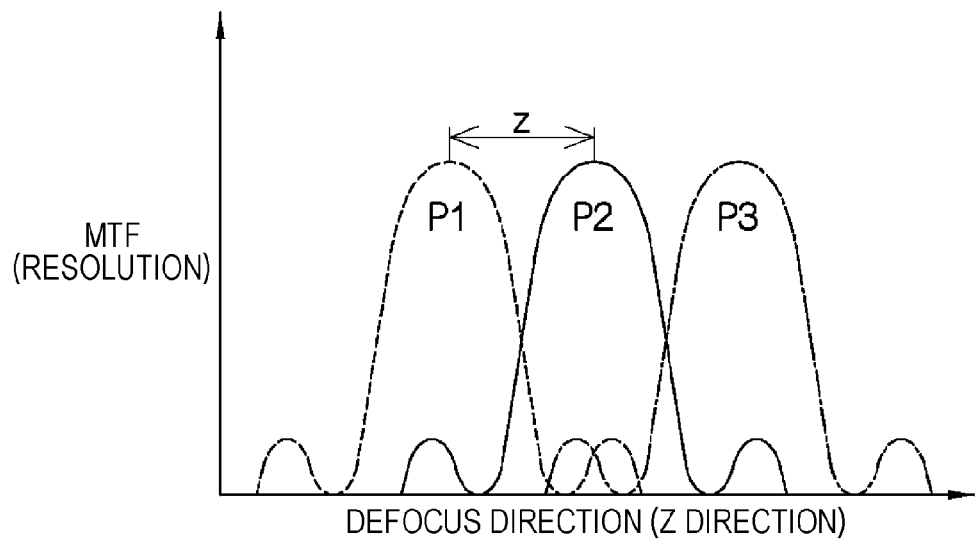
FIGS. 22A and 22B are graphs illustrating MTF-value measurement data measured by the imaging-module manufacturing device according to the third embodiment.
Figure 22B:
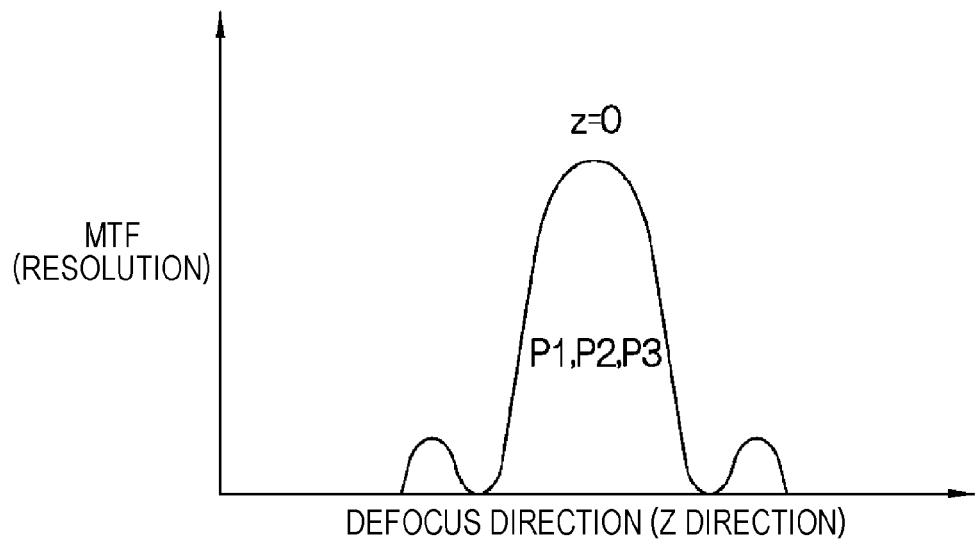

Referring to FIG. 21 and FIGS. 22A and 22B, a method for manufacturing an imaging module and an imaging-module manufacturing device according to a third embodiment of the present invention are described below. In the second embodiment, CTF values at multiple imaging positions are calculated for multiple measurement positions (Z0, Z1, Z2, . . . ) set on the Z-axis. On the basis of the calculation results, the horizontal focus coordinate and the vertical focus coordinate (first focus information and second focus information) are acquired. In the third embodiment, on the other hand, modulation transfer function values (Modulation Transfer Function: hereinafter abbreviated to MTF) indicating the resolutions of the lens group 12 as focus evaluation values are calculated to acquire the first focus information and the second focus information.

An imaging-module manufacturing device 200A used in the imaging-module manufacturing method according to the third embodiment has basically the same configuration as the imaging-module manufacturing device 200 according to the second embodiment except that it calculates MTF values instead of CTF values as focus evaluation values. Thus, components having the same functions and configurations as those according to the second embodiment are denoted by the same reference symbols and are not described. Here, for calculation of MTF values, a measurement chart 89A (see FIG. 24) having, for example, a stripe pattern (also referred to as a ladder pattern or a rectangular wave pattern) in which white and black lines are alternately arranged in parallel is used in the imaging-module manufacturing device 200A.

As illustrated in FIG. 21, in the imaging-module manufacturing device 200A, the control unit 85 controls the second slide stage 123 to sequentially move the imaging device unit 20 in the Z direction (defocus direction) to the multiple measurement positions (Z0, Z1, Z2, . . . ). The control unit 85 controls the imaging-device driver 147 to cause the imaging device 27 to capture chart images of the measurement chart 89A imaged by the lens group 12 at the measurement positions (Z0, Z1, Z2, . . . ).

A MTF-value calculation circuit 156 extracts pixel signals corresponding to the multiple imaging positions (P1, P2, and P3) from among the image-capturing signals input through the connector cable 127 or the like and calculates the individual MTF values corresponding to the multiple imaging positions from the pixel signals. The number of imaging positions is not limited to a particular number. A MTF value is a value representing the solution of the lens group 12. When the MTF value is high, the degree of focus is regarded as being high.

The MTF-value calculation circuit 156 calculates MTF values at multiple imaging positions in multiple directions set on the XY planes of coordinates at each of multiple measurement positions (Z0, Z1, Z2, . . . ) set on the Z-axis. The directions for which a MTF value is calculated are, for example, a horizontal direction (X direction), which is a lateral direction of the imaging surface 27a, and a vertical direction (Y direction), perpendicular to the horizontal direction. An X-MTF value and a Y-MTF value, which are MTF values of the respective directions, are calculated. Thus, MTF-value measurement data, obtained by measuring the X-MTF values and the Y-MTF values at multiple imaging positions (P1, P2, and P3) at each of the multiple measurement positions (Z0, Z1, Z2, . . . ), are obtained. The MTF-value calculation circuit 156 outputs the MTF-value measurement data to an adjustment calculation circuit 153A.

The MTF-value measurement data acquired in the state where the magnetic-field generating unit 300 is not set in the imaging-module manufacturing device 200 correspond to the first focus information of the present invention. An operation of acquiring the MTF-value measurement data corresponding to this first focus information corresponds to the focus information acquiring step of the present invention. The MTF-value measurement data acquired in the state where the magnetic-field generating unit 300 is set in the imaging-module manufacturing device 200 correspond to the second focus information of the present invention.

FIG. 22A illustrates an example of the MTF-value measurement data of the Y-MTF values. FIG. 22B illustrates an example of the MTF-value measurement data of the Y-MTF values in the case where the lens group 12 is adjusted to be in the second reference position, in which the peaks of the waveforms of the MTF values corresponding to the multiple imaging positions (P1, P2, and P3) substantially coincide with one another. Thus, when the positions of the peaks of the waveforms of the MTF values corresponding to the multiple imaging positions (P1, P2, and P3) are calculated from the MTF-value measurement data, the X-direction rotation angle, which is a rotation angle around the X-axis for adjusting the lens group 12 to be in the second reference position, can be calculated on the basis of the differences between the positions of individual peaks (reference position calculation step).

For example, the X-direction rotation angle is obtained as θ in formula [tan θ=z/y], where a difference between peak positions of the imaging position P1 and the imaging position P2 is denoted by "z" and a difference in position in the Y direction between the imaging position P1 and the imaging position P2 is denoted by "y" (see FIG. 21). In the same manner, the Y-direction rotation angle can be calculated from the MTF-value measurement data corresponding to the X-MTF value.

Figure 23A:
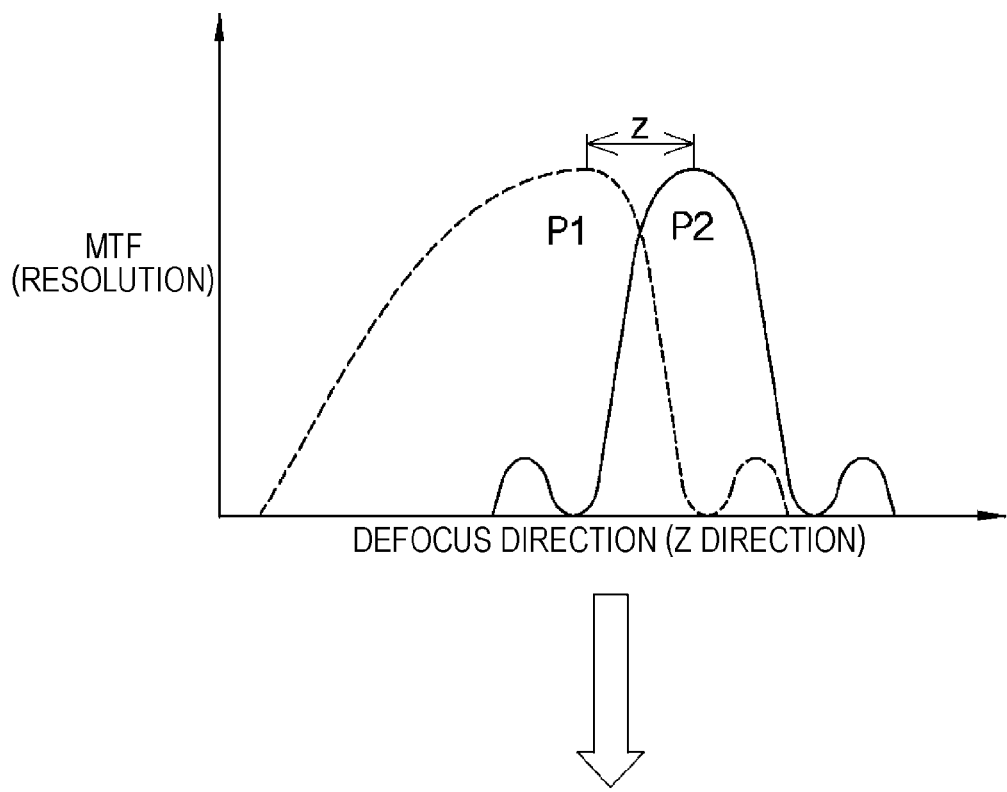
FIGS. 23A and 23B are graphs illustrating a calculation of a XY-directional rotation angle in the case where a waveform of a MTF value of the MTF-value measurement data measured by the imaging-module manufacturing device according to the third embodiment has a shape of a substantially bilateral asymmetry with respect to the peak position.
Figure 23B:
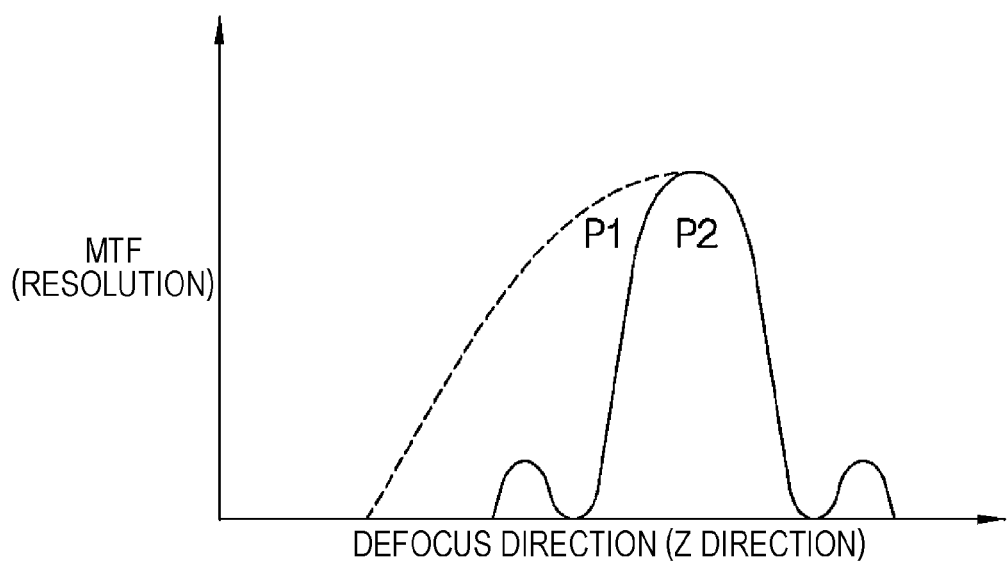

Each of the waveforms of the MTF values corresponding to the multiple imaging positions (P1, P2, and P3) illustrated in FIGS. 22A and 22B has a substantially laterally symmetrical shape with respect to the peak position of the waveform. However, as illustrated in FIG. 23A for example, the waveform of a MTF value has, in some cases, a laterally asymmetrical shape with respect to the peak position of the waveform. Even in such a case, as illustrated in FIG. 23B, the XY-directional rotation angle at which the peak positions of the waveforms of the MTF values corresponding to multiple imaging positions (FIGS. 23A and 23B illustrate only P1 and P2) overlap with each other is calculated.

Referring back to FIG. 21, the adjustment calculation circuit 153A calculates the XY-directional rotation angle by calculating the difference between the peak positions of the waveforms of the MTF values corresponding to the multiple imaging positions (P1, P2, and P3) on the basis of the MTF-value measurement data input from the MTF-value calculation circuit 156, as described above referring to the FIGS. 22A and 22B.

As in the case of the second embodiment, the adjustment calculation circuit 153A outputs the "reference XY-directional rotation angle" to the compensation circuit 154 as the XY-directional rotation angle in the state where the magnetic-field generating unit 300 is not set in the imaging-module manufacturing device 200. On the other hand, the adjustment calculation circuit 153A outputs the "tilted XY-directional rotation angle" to the compensation circuit 154 as the XY-directional rotation angle in the state where the magnetic-field generating unit 300 is set in the imaging-module manufacturing device 200. Since both "reference XY-directional rotation angle" and "tilted XY-directional rotation angle" are numerical values indicating the second reference position of the lens group 12, the adjustment calculation circuit 153A according to the third embodiment corresponds to the reference position calculation portion of the present invention.

As in the case of the second embodiment, the compensation circuit 154 calculates the XY-directional compensation value on the basis of results obtained by comparing the reference XY-directional rotation angle and the tilted XY-directional rotation angle input from the adjustment calculation circuit 153A and stores the XY-directional compensation value in the compensation value storage portion 155. The compensation circuit 154 also calculates the compensated XY-directional rotation angle obtained by compensating the reference XY-directional rotation angle input from the adjustment calculation circuit 153A with the XY-directional compensation value and outputs the compensated XY-directional rotation angle to the control unit 85. As in the case of the second embodiment, the XY-directional compensation value that has been input from the input unit 131 may be used as XY-directional compensation value.

On the basis of the compensated XY-directional rotation angle input from the compensation circuit 154, the control unit 85 controls the biaxial rotation stage 119 to adjust the tilt of the imaging device unit 20. Thereafter, the processes from step S12 to step S14 described in the second embodiment (see FIG. 20) are performed to fix the lens unit 10 and the imaging device unit 20 together (fixing step).

In this manner, also in the third embodiment as in the case of the second embodiment, the lens group 12 is tilted relative to the imaging device 27 from the above-described second reference position by an amount of tilt by which the lens group 12 is tilted due to the effect of the magnetic field of the magnetic-field generating unit 300 in a direction opposite to the direction of tilt in which the lens group 12 is tilted due to the effect of the magnetic field. Thus, when the imaging module 100 manufactured with the third embodiment is installed in the electronic device 301, the movable image-stabilizing unit 30 is tilted due to the magnetic field being applied from the magnetic-field generating unit 300 to the lens unit 10, so that the lens group 12 is adjusted to be in the second reference position. As a result, effects the same as those described in the second embodiment are obtained.

<Another Example of Third Embodiment: Measurement of Low-Frequency MTF>

In the third embodiment, MTF values are measured as the resolution in the present invention. The MTF values are preferably low-frequency MTFs.

Figure 24A:
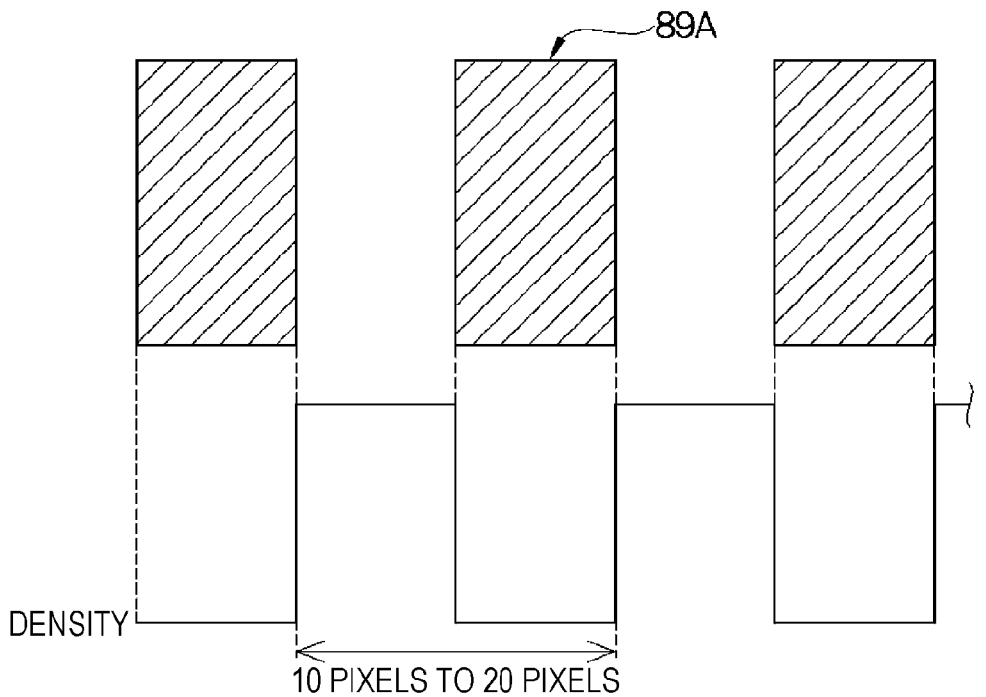
FIG. 24A is an illustration illustrating a low-frequency MTF and FIG. 24B is an illustration illustrating a high-frequency MTF.
Figure 24B:
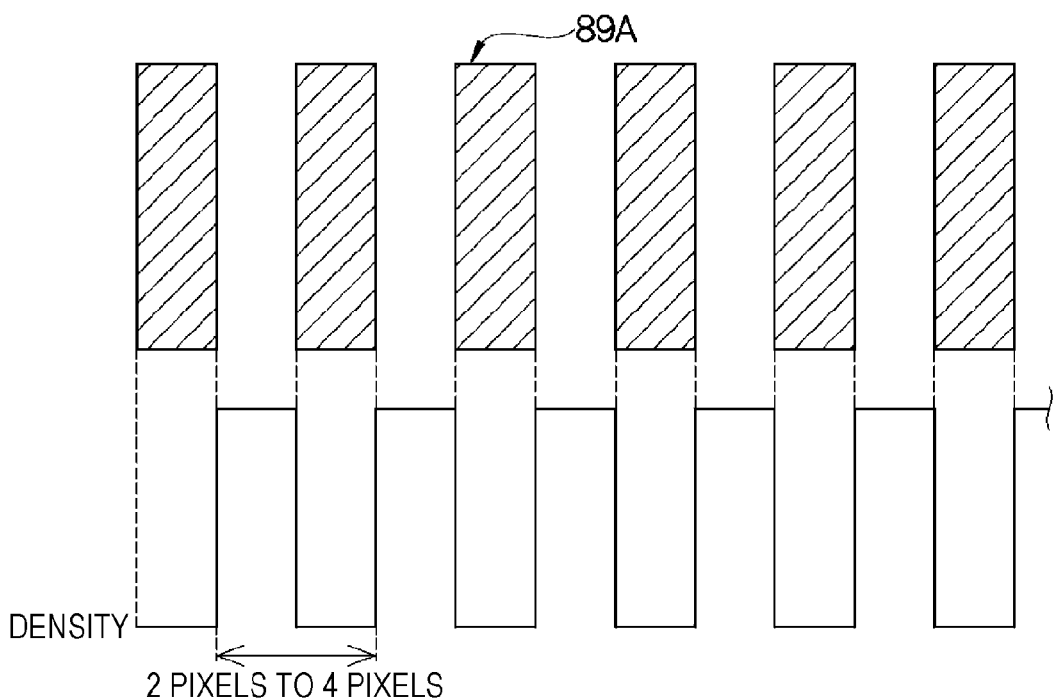

As illustrated in FIG. 24A, the "low-frequency MTFs" here are MTF values obtained by capturing images of the stripe-patterned measurement chart 89A having a pattern pitch corresponding to 10 pixels to 20 pixels of the imaging device 27. Here, as illustrated in FIG. 24B, the "high-frequency MTFs" are MTF values obtained by capturing images of the stripe-patterned measurement chart 89A having a pattern pitch corresponding to 2 pixels to 4 pixels of the imaging device 27. The low-frequency MTFs represent the performance such as the contrast or tightness in black. On the other hand, the high-frequency MTFs represent the performance of the resolving power (for example, the performance of whether small characters written on a signboard or the like are legible). The high-frequency MTFs of the lens group 12 are typically measured in the case where manufacturing errors such as formation or assembly errors of the lens group 12 are to be measured.

Here, any MTF values will suffice as long as the imaging-module manufacturing device 200A can calculate the "reference XY-directional rotation angle" and the "tilted XY-directional rotation angle" on the basis of the MTF values. If the high-frequency MTFs are used, manufacturing errors of the lens group 12 are reflected on the calculation results of the "reference XY-directional rotation angle" and the "tilted XY-directional rotation angle". Accurate calculations of the "reference XY-directional rotation angle" and the "tilted XY-directional rotation angle" are thus failed. Thus, it is preferable that the imaging-module manufacturing device 200A measure low-frequency MTFs as MTF values. The effect of the magnetic field can thus be accurately measured, so that more accurate "reference XY-directional rotation angle" and "tilted XY-directional rotation angle" can be calculated while the effect of the manufacturing errors of the lens group 12 is suppressed.

<Another Example of Third Embodiment: Others>

Although the third embodiment does not include the description on the calculation of the image-formation surface coordinates or the adjustment of the position of the imaging device unit 20 in the Z direction, which have been described in the second embodiment, the calculation and the adjustment may be performed in the same manner as in the case of the second embodiment. The contents described in another example of the second embodiment are also applicable to the third embodiment. In the second and third embodiments, CTF values or MTF values are measured as values indicating the resolutions of the lens group 12. However, spatial frequency response (SFR) values or other values may be measured, instead. Alternatively, the resolution of the lens group 12 may be measured from images of, for example, a landscape.

[Example of Imaging Module Used in Smartphone]

Examples of the electronic device 301 in which the imaging module 100 having the above-described configuration is installed include smartphones, mobile phones, tablet machines, personal digital assistants (PDAs), glass-shaped information terminals, hand-held game machines, portable music players, and camera-equipped watches. A smartphone is taken as an example and described below in detail referring to the drawings.

Figure 25:
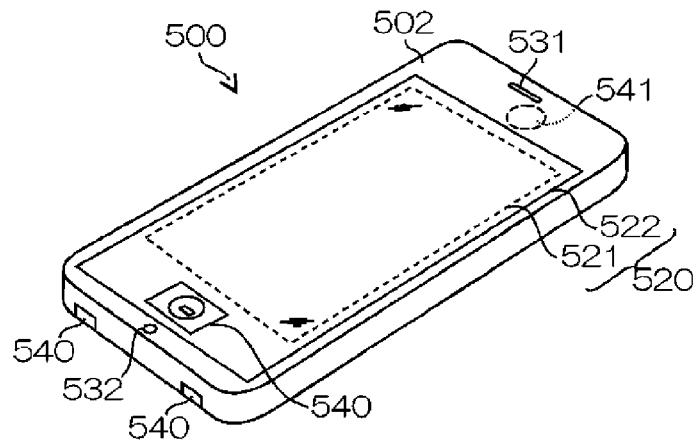
FIG. 25 illustrates the exterior of a smartphone, which is an embodiment of the electronic device.

FIG. 25 illustrates the external appearance of a smartphone 500 in which the imaging module 100 is installed. The smartphone 500 illustrated in FIG. 25 includes a housing 502 having a flat plate shape and includes, on one surface of the housing 502, a display input unit 520 in which a display panel 521, serving as a display portion, and a control panel 522, serving as an input unit, are integrated together. The housing 502 includes a speaker 531, a microphone 532, an operating unit 540, and a camera unit 541 including the above-described imaging module 100.

The camera unit 541 is disposed near the speaker 531, which is a magnetic-field generating unit, and on the back surface that opposes the operation-side surface on which the speaker 531 is disposed. The configuration of the housing 502 is not limited to this. For example, another configuration in which the display portion and the input unit are separately provided may be employed or a configuration having a collapsible structure or a sliding mechanism may be employed.

Figure 26:
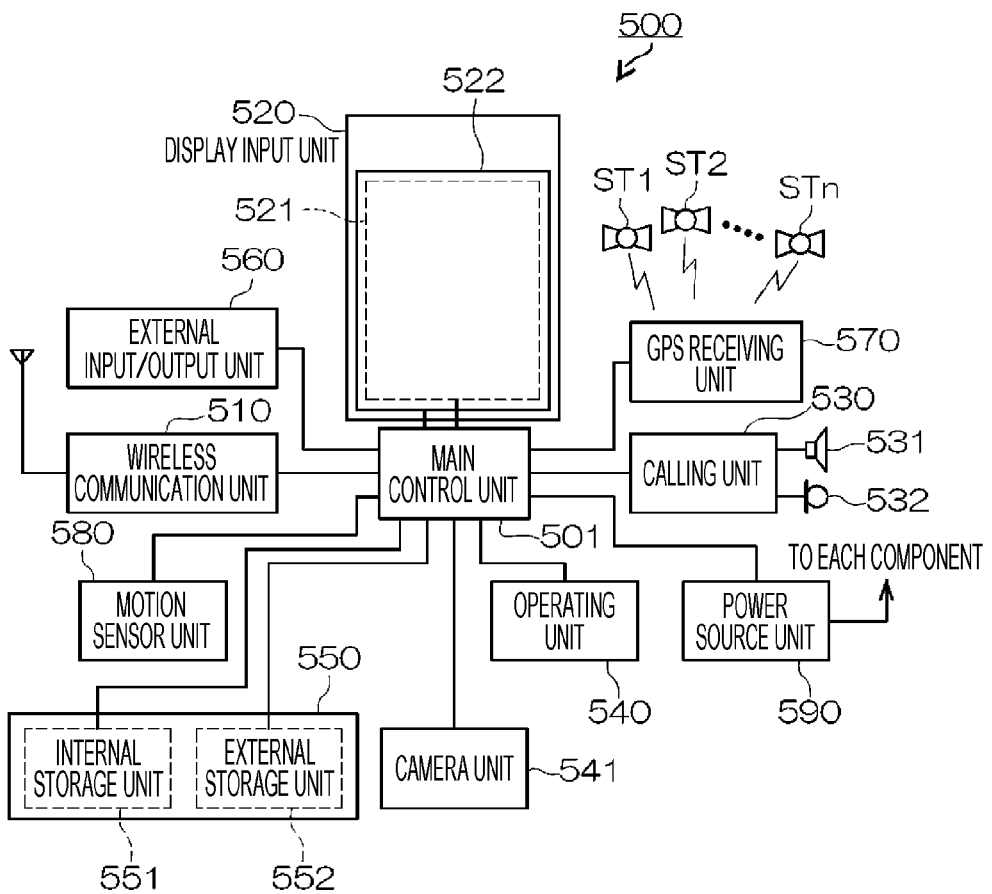
FIG. 26 is a block diagram of the electrical configuration of the smartphone.

FIG. 26 is a block diagram illustrating the configuration of the smartphone 500 illustrated in FIG. 25. As illustrated in FIG. 26, the smartphone 500 includes, as main components, a wireless communication unit 510, a display input unit 520, a calling unit 530, operating units 540, a camera unit 541, a storage unit 550, an external input/output unit 560, a global positioning system (GPS) receiving unit 570, a motion sensor unit 580, a power source unit 590, and a main control unit 501. The smartphone 500 has, as a main function, a wireless communication function with which it performs mobile wireless communication via base station devices and a mobile communication network.

In accordance with commands from the main control unit 501, the wireless communication unit 510 performs wireless communication with base station devices accommodated in the mobile communication network. Using this wireless communication, the wireless communication unit 510 transmits or receives data such as various types of file data including audio data and image data or e-mail data or receives data such as web data or streaming data.

The display input unit 520 is a so-called touch screen that, under the control of the main control unit 501, displays image (still image and moving image) or text data to visually transmit information to users and detects user operations performed in response to the displayed information. The display input unit 520 includes a display panel 521 and a control panel 522. It is preferable that the display panel 521 be a three-dimensional display panel for displaying three-dimensional images generated.

In the display panel 521, a liquid crystal display (LCD), an organic electro-luminescence display (OELD), or the like is used as a display device.

The control panel 522 is a device that is placed so as to allow images displayed on the display surface of the display panel 521 visible and that detects coordinates operated by a user's finger or a stylus. When the device is operated by a user's finger or a stylus, a detection signal that results from the operation is output to the main control unit 501. Subsequently, the main control unit 501 detects operated positions (coordinates) on the display panel 521 on the basis of the received detection signal.

As illustrated in FIG. 25, the display panel 521 and the control panel 522 of the smartphone 500 are integrated together to constitute the display input unit 520. The control panel 522 is disposed so as to fully cover the display panel 521. In the case where this disposition is employed, the control panel 522 may also have a function with which it detects user operations performed in an area outside the display panel 521. In other words, the control panel 522 may include a detection area corresponding to an overlapping portion that overlaps with the display panel 521 (hereinafter referred to as a display area) and a detection area corresponding to a remaining outer-edge portion that does not overlap the display panel 521 (hereinafter referred to as a nondisplay area).

The size of the display area and the size of the display panel 521 may completely coincide with each other but do not necessarily have to coincide with each other. The control panel 522 may include two sensitive areas, that is, an outer-edge portion and the remaining inner portion. The width of the outer-edge portion is appropriately designed in accordance with, for example, the size of the housing 502. Examples of position detection methods employed in the control panel 522 include a matrix switch method, a resistive film method, a surface acoustic wave method, an infrared ray method, an electromagnetic induction method, and a capacitive method. Any of these methods may be employed.

The calling unit 530 includes a speaker 531 and a microphone 532. The calling unit 530 is a portion that converts a user's voice input through the microphone 532 into audio data processible by the main control unit 501 and outputs the audio data to the main control unit 501 or that decodes the audio data received by the wireless communication unit 510 or the external input/output unit 560 and outputs the decoded audio data from the speaker 531. As illustrated in FIG. 25, the speaker 531 and the microphone 532 may be disposed on, for example, the same surface on which the display input unit 520 is disposed.

The operating units 540 are hardware keys including key switches and are portions that receive commands from the user. For example, the operating units 540 are disposed at a portion below and on a side below the display portion of the housing 502 of the smartphone 500 and are push-button switches that are turned on when pushed by a finger or the like and turned off when the finger is taken off due to the resilience of, for example, a spring.

The storage unit 550 is a portion that stores control programs or control data of the main control unit 501, address data in which the names, the telephone numbers, and other information of communication counterparts are associated with one another, transmitted and received e-mail data, web data downloaded through web browsing, or downloaded content data, and temporality stores streaming data or other data. The storage unit 550 includes an internal storage unit 551 installed in the smartphone and an external storage unit 552 including a removable external memory slot. Each of the internal storage unit 551 and the external storage unit 552 that constitute the storage unit 550 is embodied by using a storage medium such as a flash memory type memory, a hard disk type memory, a MultiMediaCardmicro type memory, a card type memory (for example, microSD (registered trademark)), a random access memory (RAM), or a read only memory (ROM).

The external input/output unit 560 is a portion that acts as an interface between the smartphone 500 and all the external devices connected to the smartphone 500. The external input/output unit 560 is used to directly or indirectly connect to other external devices through communications (for example, Universal Serial Bus (USB), IEEE1394, or the like) or a network (for example, Internet, wireless LAN, Bluetooth (registered trademark), radio frequency identification (RFID), infrared transmission (Infrared Data Association: IrDA) (registered trademark), Ultra wideband (UWB) (registered trademark), or ZigBee (registered trademark)).

Examples of the external devices connected to the smartphone 500 include a wired/wireless headset, a wired/wireless external charger, a wired/wireless data port, a memory card connected to the smartphone 500 through a card socket, a subscriber identity module (SIM) card, a user identity module (UIM) card, an external audio/video device connected to the smartphone 500 through an audio/video input/output (I/O) terminal, an external audio/video device wirelessly connected to the smartphone 500, a smartphone connected to the smartphone 500 with wires or wirelessly, a personal computer connected to the smartphone 500 with wires or wirelessly, a personal digital assistant (PDA) connected to the smartphone 500 with wires or wirelessly, and an earphone. The external input/output portion can transmit data transmitted from these external devices to each component in the smartphone 500 or cause data inside the smartphone 500 to be transmitted to the external devices.

In accordance with commands from the main control unit 501, the GPS receiving unit 570 receives GPS signals transmitted from GPS satellites ST1 to STn, performs a position-measurement process on the basis of the multiple GPS signals received, and detects the position of the smartphone 500 defined by latitude, longitude, and altitude. When the GPS receiving unit 570 can obtain position information from the wireless communication unit 510 or the external input/output unit 560 (for example, wireless LAN), the GPS receiving unit 570 can detect the position using the position information.

The motion sensor unit 580 includes, for example, a three-axis accelerometer and detects a physical movement of the smartphone 500 in accordance with a command from the main control unit 501. By detecting a physical movement of the smartphone 500, the direction in which the smartphone 500 moves or the acceleration of the smartphone 500 is detected. The result of this detection is output to the main control unit 501.

In accordance with a command from the main control unit 501, the power source unit 590 supplies power storable in a battery (not illustrated) to each unit of the smartphone 500.

The main control unit 501 includes a microprocessor. The main control unit 501 operates in accordance with a control program or control data stored in the storage unit 550 and controls all the components of the smartphone 500. The main control unit 501 has a mobile communication control function, with which it controls each of the communication-related units, and an application processing function in order to perform voice communication or data communication through the wireless communication unit 510.

The application processing function is performed as a result of the main control unit 501 operating in accordance with an application software stored in the storage unit 550. Examples of the application processing function include an infrared communication function for performing data communication with an opposing device under the control of the external input/output unit 560, an e-mail function for transmitting and receiving e-mails, and a web browsing function for browsing web pages.

The main control unit 501 has an image processing function for, for example, displaying an image on the display input unit 520 on the basis of image data (still-image or moving-image data) such as the received data or downloaded streaming data. The image processing function is a function with which the main control unit 501 decodes the image data, performs image processing on the decoded data, and displays an image on the display input unit 520.

The main control unit 501 also performs display control on the display panel 521 and an operation detection control to detect a user operation performed through the operating unit 540 and the control panel 522.

By executing the display control, the main control unit 501 displays software keys such as icons for activing application software or scrollbars or displays a window for composing e-mails. Here, the scrollbars represent software keys used for receiving a command of moving a displayed portion of an image that is, for example, too large to be displayed over the display area of the display panel 521.

By executing the operation detection control, the main control unit 501 detects a user operation performed through the operating unit 540, receives, through the control panel 522, an operation on the icons or an input of a character string on an entry field of the window, or receives a request of scrolling a displayed image through the scrollbars.

the main control unit 501 has a touch screen control function with which it determines, by executing the operation detection control, whether the operation position on the control panel 522 is in the overlapping portion that overlaps the display panel 521 (display area) or in the remaining outer-edge portion that does not overlap the display panel 521 (nondisplay area) and with which it controls the sensitive areas of the control panel 522 or the display positions of the software keys.

The main control unit 501 can detect a gesture operation performed on the control panel 522 and execute a preset function in accordance with the detected gesture operation. The gesture operation is not a conventional simple touch operation but an operation of drawing a trail using a finger or the like, an operation of concurrently specifying multiple positions, or a combination of these operations in which a trail is drawn from at least one of the multiple positions.

The camera unit 541 is a digital camera that performs electronic photographing using an imaging device such as a complementary metal oxide semiconductor (CMOS) or a charge-coupled device (CCD). The above-described imaging module 100 is used in this camera unit 541.

Under the control of the main control unit 501, the camera unit 541 can convert image data obtained from photographing into image data compressed in a form of JPEG (created by Joint Photographic coding Experts Group) or in another form and record the image data in the storage unit 550 or output the image data through the external input/output unit 560 or the wireless communication unit 510. As illustrated in FIG. 25, in the smartphone 500, the camera unit 541 is installed on the back surface opposing the display input unit 520. However, the position at which the camera unit 541 is installed is not limited to this. The camera unit 541 may be installed on the same surface as the surface on which the display input unit 520 is installed. Alternatively, multiple camera units 541 may be installed. In the case where multiple camera units 541 are installed, the camera units 541 may be switched one from another so that one of the camera units 541 is used for photographing at a time or the multiple camera units 541 may be simultaneously used for photographing.

The camera unit 541 is usable for exerting various functions of the smartphone 500. For example, images captured by the camera unit 541 can be displayed on the display panel 521 or images captured by the camera unit 541 are usable as an input of operations of the control panel 522. In addition, when the GPS receiving unit 570 is to detect the position, it can detect the position with reference to images from the camera unit 541. Moreover, the optical axis direction of the camera unit 541 of the smartphone 500 or the current operation conditions can be determined with reference to images from the camera unit 541 without using a three-axis accelerometer or by using the camera unit 541 together with a three-axis accelerometer. Naturally, images from the camera unit 541 are usable in the application software.

[Others]

In the OIS mechanism according to this embodiment, the OIS driving coils are disposed on the base member side (stationary side) and the OIS driving magnets are disposed on the movable image-stabilizing unit side (movable side). Conversely, the OIS driving magnets may be disposed on the base member side and the OIS driving coils may be disposed on the movable image-stabilizing unit side. The lens group 12 is not limited to a group constituted by five lenses. The lens group 12 may include various lenses.

The elastic support unit according to this embodiment includes a leaf spring and suspension wires. However, the present invention is applicable to a method for manufacturing an imaging module and an imaging-module manufacturing device that include various types of elastic support units that support the movable image-stabilizing unit (lens group) such that the lens group is moveable in a direction/ directions perpendicular to the optical axis of the lens group and tiltable around an axis/axes perpendicular to the optical axis.

The present invention is not limited to the above-described embodiments and it should be understood that various changes or modifications may be made within the scope not departing from the spirit of the present invention.

REFERENCE SIGNS LIST

10: lens unit, 18: adhesive, 20: imaging device unit, 27: imaging device, 30: movable image-stabilizing unit, 40: elastic support unit, 50: OIS mechanism, 71: measurement-chart installation portion, 77: lens-unit holding portion, 79: imaging-device-unit holding portion, 81: adhesive supplying portion, 83: ultraviolet lamp, 85: control unit, 87: shaft, 89: measurement chart, 89A: measurement chart, 100: imaging module, 131: input unit, 149: focus-coordinate acquiring circuit, 151: image-formation-surface calculation circuit, 153: adjustment calculation circuit, 153A: adjustment calculation circuit, 154: compensation circuit, 155: compensation value storage portion, 156: MTF-value calculation circuit, 190: imaging-module manufacturing device, 200: imaging-module manufacturing device, 200A: imaging-module manufacturing device, 240: fixing jig, 246: ultraviolet lamp, 300: magnetic-field generating unit, 301: electronic device, and 500: smartphone.

What is claimed is:

1. A method for manufacturing an imaging module,
wherein the imaging module comprises, a lens unit having a lens group, and an imaging device unit being fixed to the lens unit and having an imaging device that captures an image of an object through the lens group, and
wherein the lens unit comprises a movable image-stabilizing unit having the lens group and a magnetic member, and an elastic support unit supporting the movable image-stabilizing unit such that the movable image-stabilizing unit is movable in a direction perpendicular to an optical axis of the lens group and tiltable around an axis perpendicular to the optical axis, the method comprising:
a tilt amount and direction acquiring step that acquires a tilt amount and a tilt direction of the movable image stabilizing unit from a first reference position perpendicular to an imaging surface of the imaging device, in a state where the lens unit is installed in an electronic device including a magnetic-field generating unit; and
a fixing step that fixes the lens unit and the imaging device unit to each other in a state where the optical axis of the lens group is tilted from the first reference position by the tilt amount in a direction opposite to the tilt direction.

2. The method for manufacturing an imaging module according to claim 1, wherein the tilt amount and the tilt direction of the movable image-stabilizing unit are acquired by measuring in a state where a magnetic field is applied from the magnetic-field generating unit to the lens unit and in a state where a magnetic field is not applied from the magnetic-field generating unit to the lens unit respectively and comparing the tilt amounts and the tilt directions with each other.

3. The method for manufacturing an imaging module according to claim 2, wherein in the fixing step, the lens unit and the imaging device unit are fixed to each other by supplying an adhesive between the lens unit and the imaging device unit and by causing the adhesive to cure after the lens unit is tilted relative to the imaging device unit.

4. The method for manufacturing an imaging module according to claim 2, wherein a pixel pitch of the imaging device is smaller than or equal to 1.0 µm.

5. The method for manufacturing an imaging module according to claim 1, wherein in the fixing step, the lens unit and the imaging device unit are fixed to each other by supplying an adhesive between the lens unit and the imaging device unit and by causing the adhesive to cure after the lens unit is tilted relative to the imaging device unit.

6. The method for manufacturing an imaging module according to claim 1, wherein a pixel pitch of the imaging device is smaller than or equal to 1.0 µm.

7. A method for manufacturing an imaging module,
wherein the imaging module comprises a lens unit having a lens group, and an imaging device unit being fixed to the lens unit and having an imaging device that captures an image of an object through the lens group and,
wherein the lens unit comprises a movable image-stabilizing unit having the lens group and a magnetic member, and an elastic support unit supporting the movable image-stabilizing unit such that the movable image-stabilizing unit is movable in a direction perpendicular to an optical axis of the lens group and tiltable around an axis perpendicular to the optical axis, the method comprising:
a focus information acquiring step that acquires first focus information indicating a degree of focus at a plurality of imaging positions determined on an imaging surface of the imaging device from image-capturing signals of the imaging device acquired by setting the imaging device unit and the lens unit on an axis perpendicular to a measurement chart, changing a relative position of the imaging device unit, the lens unit, and the measurement chart on the axis perpendicular to the measurement chart to a plurality of relative positions, and capturing images of the measurement chart using the imaging device at the relative positions;
a reference position calculation step that calculate a second reference position of the lens group on the basis of the first focus information acquired in the focus information acquiring step;
a tilt amount and direction acquiring step that acquires a tilt amount and a tilt direction of the movable image stabilizing unit in a state where the lens unit is installed in an electronic device including a magnetic-field generating unit; and
a fixing step that fixes the lens unit and the imaging device unit to each other, on a basis of the second reference position calculated in the reference position calculation step and the tilt amount and the tilt direction of the movable image-stabilizing unit, in a state where the optical axis of the lens group is tilted from the second reference position by the tilt amount in a direction opposite to the tilt direction.

8. The method for manufacturing an imaging module according to claim 7, wherein the tilt amount and the tilt direction of the movable image-stabilizing unit are acquired by measuring in a state where a magnetic field is applied from the magnetic-field generating unit to the lens unit and in a state where a magnetic field is not applied from the magnetic-field generating unit to the lens unit respectively and comparing the tilt amounts and the tilt directions with each other.

9. The method for manufacturing an imaging module according to claim 8, wherein in the fixing step, the lens unit and the imaging device unit are fixed to each other by supplying an adhesive between the lens unit and the imaging device unit and by causing the adhesive to cure after the lens unit is tilted relative to the imaging device unit.

10. The method for manufacturing an imaging module according to claim 8, wherein a pixel pitch of the imaging device is smaller than or equal to 1.0 µm.

11. The method for manufacturing an imaging module according to claim 7, wherein the tilt amount and the tilt direction are acquired by changing, in a state where a magnetic field is applied from the magnetic-field generating unit to the lens unit, a relative position of the imaging device unit, the lens unit, and the measurement chart on an axis perpendicular to the measurement chart to a plurality of relative positions, capturing images of the measurement chart at the relative positions using the imaging device, acquiring second focus information indicating a degree of focus at each of a plurality of imaging positions determined on the imaging surface at the relative positions from image-capturing signals acquired by the imaging device at the relative positions, and comparing the first focus information and the second focus information with each other.

12. The method for manufacturing an imaging module according to claim 11, wherein the first focus information and the second focus information are acquired by measuring a resolution of the lens group.

13. The method for manufacturing an imaging module according to claim 12,
wherein the measurement chart has a stripe pattern, and
wherein the first focus information and the second focus information are acquired by measuring a modulation transfer function as the resolution.

14. The method for manufacturing an imaging module according to claim 13, wherein the modulation transfer function is a low-frequency modulation transfer function acquired by capturing an image of the stripe pattern having a pattern pitch corresponding to 10 pixels to 20 pixels of the imaging device.

15. The method for manufacturing an imaging module according to claim 13, wherein the tilt amount and the tilt direction are acquired by calculating a tilt position of the lens group from the second focus information and comparing the tilt position with the second reference position.

16. The method for manufacturing an imaging module according to claim 12, wherein the tilt amount and the tilt direction are acquired by calculating a tilt position of the lens group from the second focus information and comparing the tilt position with the second reference position.

17. The method for manufacturing an imaging module according to claim 11, wherein in the fixing step, the lens unit and the imaging device unit are fixed to each other by supplying an adhesive between the lens unit and the imaging device unit and by causing the adhesive to cure after the lens unit is tilted relative to the imaging device unit.

18. The method for manufacturing an imaging module according to claim 11, wherein a pixel pitch of the imaging device is smaller than or equal to 1.0 µm.

19. The method for manufacturing an imaging module according to claim 7, wherein in the fixing step, the lens unit and the imaging device unit are fixed to each other by supplying an adhesive between the lens unit and the imaging device unit and by causing the adhesive to cure after the lens unit is tilted relative to the imaging device unit.

20. The method for manufacturing an imaging module according to claim 7, wherein a pixel pitch of the imaging device is smaller than or equal to 1.0 µm.

* * * * *